US012439003B2

(12) United States Patent
Verghese et al.

(10) Patent No.: US 12,439,003 B2
(45) Date of Patent: Oct. 7, 2025

(54) REAL-TIME ADJUSTMENT OF VEHICLE SENSOR FIELD OF VIEW VOLUME

(71) Applicant: Waymo LLC, Mountain View, CA (US)

(72) Inventors: Simon Verghese, Mountain View, CA (US); Alexander McCauley, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 309 days.

(21) Appl. No.: 17/002,092

(22) Filed: Aug. 25, 2020

(65) Prior Publication Data

US 2021/0191399 A1 Jun. 24, 2021

Related U.S. Application Data

(60) Provisional application No. 62/952,879, filed on Dec. 23, 2019.

(51) Int. Cl.
*G08G 1/048* (2006.01)
*B60W 30/095* (2012.01)
(Continued)

(52) U.S. Cl.
CPC .......... *H04N 7/18* (2013.01); *B60W 30/0956* (2013.01); *B60W 60/001* (2020.02); *G01S 7/483* (2013.01);
(Continued)

(58) Field of Classification Search
CPC ......... B60W 2420/42; B60W 2420/52; B60W 2556/45; B60W 30/0956; B60W 60/001;
(Continued)

(56) References Cited

U.S. PATENT DOCUMENTS 6,587,074 B1 * 7/2003 Winter ................. G01S 13/931
342/128
9,201,421 B1 12/2015 Fairfield et al.
(Continued)

FOREIGN PATENT DOCUMENTS

EP 3125061 A1 2/2017
JP 2006275942 A 10/2006
JP 2018-180859 A 11/2018

OTHER PUBLICATIONS

Search Report and Written Opinion for PCT/US2020/065914 dated Apr. 5, 2021.

*Primary Examiner* — Matthew J. Reda
(74) *Attorney, Agent, or Firm* — MCDONNELL BOEHNEN HULBERT & BERGHOFF LLP

(57) ABSTRACT

Disclosed are systems and methods that can be used for adjusting the field of view of one or more sensors of an autonomous vehicle. In the systems and methods, each sensor of the one or more sensors is configured to operate in accordance with a field of view volume up to a maximum field of view volume. The systems and methods include determining an operating environment of an autonomous vehicle. The systems and methods also include based on the determined operating environment of the autonomous vehicle, adjusting a field of view volume of at least one sensor of the one or more sensors from a first field of view volume to an adjusted field of view volume different from the first field of view volume. Additionally, the systems and methods include controlling the autonomous vehicle to operate using the at least one sensor having the adjusted field of view volume.

20 Claims, 9 Drawing Sheets

(51) Int. Cl.
| | |
|---|---|
| *B60W 60/00* | (2020.01) |
| *G01S 7/483* | (2006.01) |
| *G01S 7/497* | (2006.01) |
| *G01S 17/86* | (2020.01) |
| *G01S 17/89* | (2020.01) |
| *G01S 17/931* | (2020.01) |
| *G01W 1/06* | (2006.01) |
| *G05D 1/00* | (2006.01) |
| *G05D 1/81* | (2024.01) |
| *G06V 10/44* | (2022.01) |
| *G06V 10/88* | (2022.01) |
| *G06V 20/56* | (2022.01) |
| *G08G 1/01* | (2006.01) |
| *G08G 1/04* | (2006.01) |
| *H04N 7/18* | (2006.01) |
| *H04N 23/69* | (2023.01) |
| *G05D 1/243* | (2024.01) |
| *G05D 1/247* | (2024.01) |

(52) U.S. Cl.
CPC ............ *G01S 7/497* (2013.01); *G01S 17/86* (2020.01); *G01S 17/89* (2013.01); *G01S 17/931* (2020.01); *G01W 1/06* (2013.01); *G05D 1/0088* (2013.01); *G05D 1/81* (2024.01); *G06V 10/44* (2022.01); *G06V 10/89* (2022.01); *G06V 20/56* (2022.01); *G08G 1/0112* (2013.01); *G08G 1/0116* (2013.01); *G08G 1/04* (2013.01); *G08G 1/048* (2013.01); *H04N 23/69* (2023.01); *B60W 2420/403* (2013.01); *B60W 2420/408* (2024.01); *B60W 2556/45* (2020.02); *G05D 1/0251* (2013.01); *G05D 1/0257* (2013.01); *G05D 1/2435* (2024.01); *G05D 1/247* (2024.01)

(58) Field of Classification Search
CPC .... G01S 13/865; G01S 13/867; G01S 13/931; G01S 17/86; G01S 17/89; G01S 17/931; G01S 7/483; G01S 7/497; G01W 1/06; G05D 1/0088; G05D 1/0251; G05D 1/0257; G05D 2201/0213; G06V 10/44; G06V 10/507; G06V 10/89; G06V 20/56; G08G 1/0112; G08G 1/0116; G08G 1/04; G08G 1/048; H04N 5/23296; H04N 7/18
See application file for complete search history.

(56) References Cited

U.S. PATENT DOCUMENTS

| | | | |
|---|---|---|---|
| 9,201,424 B1 | 12/2015 | Ogale | |
| 9,261,881 B1 | 2/2016 | Ferguson et al. | |
| 9,841,763 B1 | 12/2017 | Valois | |
| 9,864,063 B2* | 1/2018 | Gruver | G01S 7/4813 |
| 2012/0133738 A1* | 5/2012 | Hoffmeier | G08G 1/09623 |
| | | | 348/148 |
| 2012/0310466 A1 | 12/2012 | Fairfield et al. | |
| 2013/0069773 A1* | 3/2013 | Li | B60W 40/09 |
| | | | 340/436 |
| 2014/0214255 A1* | 7/2014 | Dolgov | G05D 1/0274 |
| | | | 701/23 |
| 2014/0324266 A1 | 10/2014 | Zhu et al. | |
| 2016/0012589 A1* | 1/2016 | Hamer | H04N 7/181 |
| | | | 348/148 |
| 2016/0264063 A1* | 9/2016 | Toma | G06V 20/56 |
| 2016/0350601 A1* | 12/2016 | Grauer | G06V 10/803 |
| 2016/0357187 A1* | 12/2016 | Ansari | G08G 1/165 |
| 2017/0168146 A1 | 6/2017 | Boehmke | |
| 2017/0220875 A1* | 8/2017 | Jeromin | H04N 13/254 |
| 2017/0328729 A1 | 11/2017 | Zhu et al. | |
| 2018/0032042 A1* | 2/2018 | Turpin | H04N 13/296 |
| 2018/0032085 A1* | 2/2018 | Dolgov | G05D 1/0274 |
| 2018/0178797 A1* | 6/2018 | Seaman | B60W 10/30 |
| 2018/0180440 A1 | 6/2018 | Masuda et al. | |
| 2018/0227566 A1* | 8/2018 | Price | G01S 7/4816 |
| 2018/0267170 A1* | 9/2018 | Kuroda | G01S 15/931 |
| 2019/0011917 A1 | 1/2019 | Kuffner | |
| 2019/0043164 A1* | 2/2019 | He | H04N 7/18 |
| 2019/0088148 A1 | 3/2019 | Jacobus et al. | |
| 2019/0146511 A1* | 5/2019 | Hurd | G06F 18/251 |
| | | | 701/27 |
| 2019/0156134 A1* | 5/2019 | Krishnan | G06V 20/597 |
| 2019/0187723 A1 | 6/2019 | Tao et al. | |
| 2019/0277962 A1 | 9/2019 | Ingram et al. | |
| 2019/0281260 A1* | 9/2019 | Ozbilgin | G01S 17/86 |
| 2019/0285752 A1* | 9/2019 | Chattopadhyay | G06V 10/25 |
| 2019/0377814 A1* | 12/2019 | Shtrom | G01S 7/412 |
| 2020/0064483 A1 | 2/2020 | Li et al. | |
| 2020/0086871 A1 | 3/2020 | Gotoda et al. | |
| 2020/0166636 A1* | 5/2020 | Mihajlovic | G01S 7/411 |
| 2021/0053489 A1* | 2/2021 | Golov | B60R 11/04 |
| 2021/0195112 A1 | 6/2021 | Verghese et al. | |

* cited by examiner

REAL-TIME ADJUSTMENT OF VEHICLE SENSOR FIELD OF VIEW VOLUME

CROSS-REFERENCE TO RELATED APPLICATIONS

The present disclosure claims priority to U.S. Provisional Application No. 62/952,879 filed on Dec. 23, 2019, the entire contents of which are herein incorporated by reference.

BACKGROUND

Vehicles can be configured to operate in an autonomous mode in which the vehicle navigates through an environment with little or no input from a driver. Such autonomous vehicles can include one or more systems (e.g., sensors and associated computing devices) that are configured to detect information about the environment in which the vehicle operates. The vehicle and its associated computer-implemented controller use the detected information to navigate through the environment. For example, if the system(s) detect that the vehicle is approaching an obstacle, as determined by the computer-implemented controller, the controller adjusts the vehicle's directional controls to cause the vehicle to navigate around the obstacle.

For example, an autonomous vehicle may include lasers, sonar, radar, cameras, thermal imagers, and other sensors which scan and/or record data about the surroundings of the vehicle. Sensor data from one or more of these devices may be used to detect objects and their respective characteristics (position, shape, heading, speed, etc.). This detection and identification is useful for the operation of autonomous vehicles.

SUMMARY

In one example, the present disclosure provides a system. The system includes one or more sensors, each sensor of the one or more sensors being configured to operate in accordance with a field of view volume up, the field of view volume representing a space surrounding the autonomous vehicle within which the sensor is expected to detect objects at a confidence level higher than a predefined confidence threshold. The system also includes one or more processors coupled to the one or more sensors. The system also includes a memory coupled to the one or more processors and having stored thereon instructions that, upon execution by the one or more processors, cause the one or more processors to perform operations. The operations include identifying a plurality of operational design domains (ODDs) for the autonomous vehicle, where each ODD includes at least one of an environmental condition, a geographical condition, a time-of-day condition, a traffic condition, or a roadway condition, and where each ODD is associated with a predetermined field of view volume for at least one of the one or more sensors. The operations also include associating the autonomous vehicle with a first ODD of the plurality of ODDs. The operations also include detecting a change in an operating environment of the autonomous vehicle. The operations also include in response to the detecting, associating the autonomous vehicle with a second ODD of the plurality of ODDs. The operations also include in response to the autonomous vehicle being associated with the second ODD, operating the at least one sensor using the predetermined field of view volume associated with the second ODD.

Some examples of the present disclosure provide a method performed by a computing device configured to control operation of an autonomous vehicle. The method includes identifying a plurality of operational design domains (ODDs) for the autonomous vehicle, where each ODD includes at least one of an environmental condition, a geographical condition, a time-of-day condition, a traffic condition, or a roadway condition, and where each ODD is associated with a predetermined field of view volume for at least one of one or more sensors, where each sensor of the one or more sensors is configured to operate in accordance with a field of view volume, the field of view volume representing a space surrounding the autonomous vehicle within which the sensor is expected to detect objects at a confidence level higher than a predefined confidence threshold. The method also includes associating the autonomous vehicle with a first ODD of the plurality of ODDs. The method also includes detecting a change in an operating environment of the autonomous vehicle. The method also includes in response to the detecting, associating the autonomous vehicle with a second ODD of the plurality of ODDs. The method also includes in response to the autonomous vehicle being associated with the second ODD, operating the at least one sensor using the predetermined field of view volume associated with the second ODD.

Some examples of the present disclosure provide a non-transitory computer-readable storage medium, having stored thereon program instructions that, upon execution by one or more processors, cause the one or more processors to perform operations. The operations include identifying a plurality of operational design domains (ODDs) for the autonomous vehicle, where each ODD includes at least one of an environmental condition, a geographical condition, a time-of-day condition, a traffic condition, or a roadway condition, and where each ODD is associated with a predetermined field of view volume for at least one of one or more sensors, where each sensor of the one or more sensors is configured to operate in accordance with a field of view volume, the field of view volume representing a space surrounding the autonomous vehicle within which the sensor is expected to detect objects at a confidence level higher than a predefined confidence threshold. The operations also include associating the autonomous vehicle with a first ODD of the plurality of ODDs. The operations also include detecting a change in an operating environment of the autonomous vehicle. The operations also include in response to the detecting, associating the autonomous vehicle with a second ODD of the plurality of ODDs. The operations also include in response to the autonomous vehicle being associated with the second ODD, operating the at least one sensor using the predetermined field of view volume associated with the second ODD.

Some examples of the present disclosure provide a system. The system includes one or more sensors, each sensor of the one or more sensors being configured to operate in accordance with a field of view volume. The system also includes one or more processors coupled to the one or more sensors. The system also includes a memory coupled to the one or more processors and having stored thereon instructions that, upon execution by the one or more processors, cause the one or more processors to perform operations. The operations include determining an operating environment of an autonomous vehicle. The operations also include based on the determined operating environment of the autonomous vehicle, adjusting a field of view volume of at least one sensor of the one or more sensors from a first field of view volume to an adjusted field of view volume different from the first field of view volume.

Some examples of the present disclosure provide a method performed by a computing device configured to control operation of an autonomous vehicle. The method includes determining an operating environment of an autonomous vehicle, where the autonomous vehicle comprises one or more sensors, each sensor of the one or more sensors being configured to operate in accordance with a field of view volume. The method also includes based on the determined operating environment of the autonomous vehicle, adjusting a field of view volume of at least one sensor of the one or more sensors from a first field of view volume to an adjusted field of view volume different from the first field of view volume. The method also includes controlling the autonomous vehicle to operate using the at least one sensor having the adjusted field of view volume.

Some examples of the present disclosure provide a non-transitory computer-readable storage medium, having stored thereon program instructions that, upon execution by one or more processors, cause the one or more processors to perform operations. The operations include determining an operating environment of an autonomous vehicle, where the autonomous vehicle comprises one or more sensors, each sensor of the one or more sensors being configured to operate in accordance with a field of view volume. The operations also include based on the determined operating environment of the autonomous vehicle, adjusting a field of view volume of at least one sensor of the one or more sensors from a first field of view volume to an adjusted field of view volume different from the first field of view volume. The operations also include controlling the autonomous vehicle to operate using the at least one sensor having the adjusted field of view volume.

Some examples of the present disclosure provide a method for operating a sensor mounted on an autonomous vehicle. The method includes operating the sensor of the autonomous vehicle in accordance with a first field of view volume, where the first field of view volume is associated with a first operating environment of an autonomous vehicle. The method also includes receiving data indicating a second operating environment of the autonomous vehicle, where the second operating environment is associated with an environmental condition in an environment of the autonomous vehicle. The method also includes automatically adjusting an operation of the sensor to operate in accordance with a second field of view volume, where the second field of view volume is associated with the second operating environment.

Some examples of the present disclosure provide a system for operating a sensor mounted on an autonomous vehicle. The system includes the sensor and one or more processors coupled to the sensor. The system also includes a memory coupled to the one or more processors and having stored thereon instructions that, upon execution by the one or more processors, cause the one or more processors to perform operations. The operations include operating the sensor of the autonomous vehicle in accordance with a first field of view volume, where the first field of view volume is associated with a first operating environment of an autonomous vehicle. The operations also include receiving data indicating a second operating environment of the autonomous vehicle, where the second operating environment is associated with an environmental condition in an environment of the autonomous vehicle. The operations also include automatically adjusting an operation of the sensor to operate in accordance with a second field of view volume, where the second field of view volume is associated with the second operating environment.

Some examples of the present disclosure provide a non-transitory computer-readable storage medium, having stored thereon program instructions that, upon execution by one or more processors, cause the one or more processors to perform operations. The operations include operating a sensor mounted on an autonomous vehicle in accordance with a first field of view volume, where the first field of view volume is associated with a first operating environment of the autonomous vehicle. The operations also include receiving data indicating a second operating environment of the autonomous vehicle, where the second operating environment is associated with an environmental condition in an environment of the autonomous vehicle. The operations also include automatically adjusting an operation of the sensor to operate in accordance with a second field of view volume, where the second field of view volume is associated with the second operating environment.

These as well as other aspects, advantages, and alternatives, will become apparent to those of ordinary skill in the art by reading the following detailed description, with reference where appropriate to the accompanying drawings.

DETAILED DESCRIPTION

Figure 1:
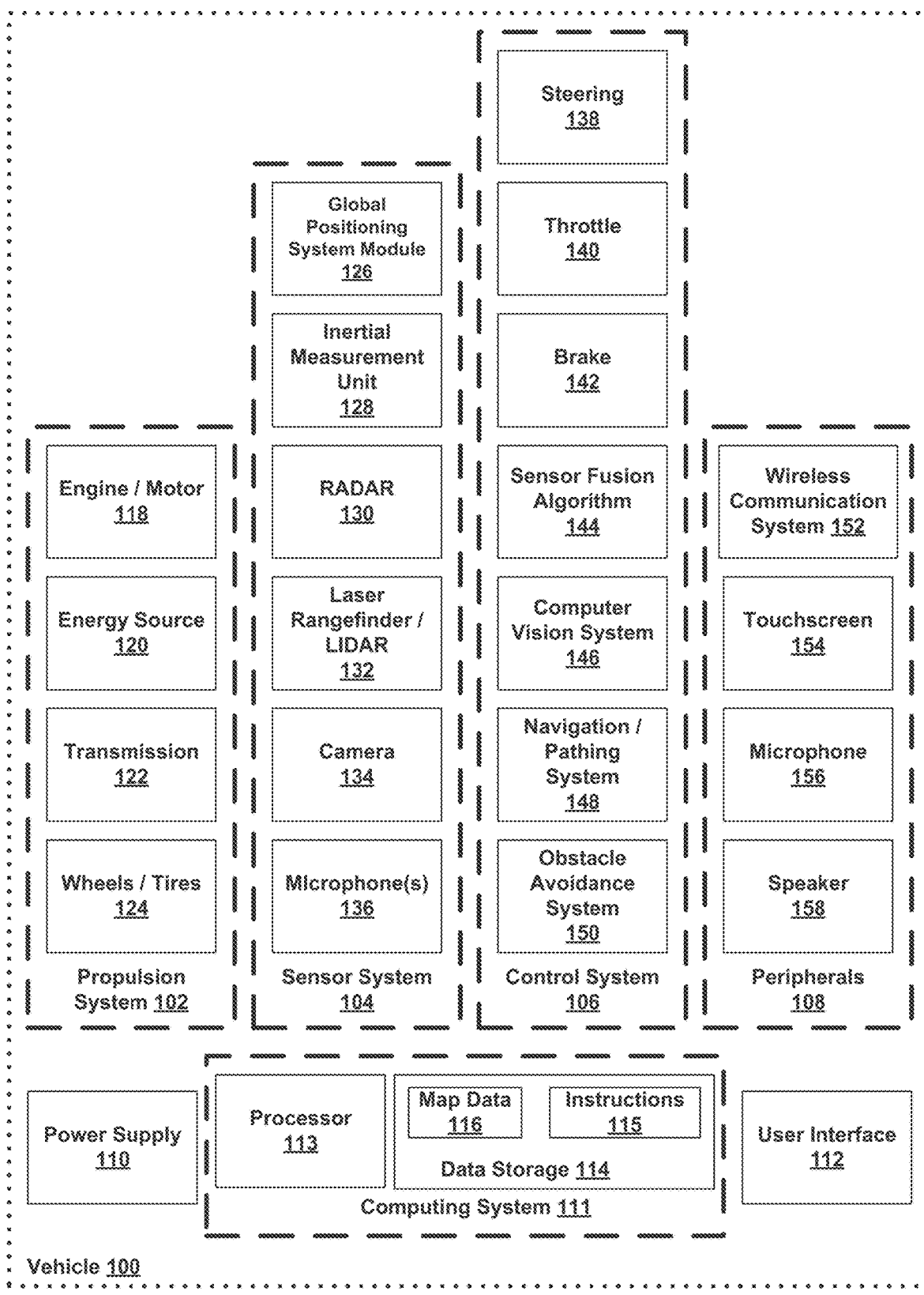
FIG. 1 is a functional block diagram depicting aspects of an example autonomous vehicle.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Many vehicles include various sensing systems to aid in the navigation and control of the vehicle. Some vehicles may operate in a fully autonomous mode, where no human interaction is used for operations, a semi-autonomous mode, where little human interaction is used for operations, or a human-operated mode, where a human operates the vehicle and sensors may aid the human. The sensors may be used to provide information about the region around the vehicle. This information may be used to identify features of the roadway and other objects (such as other vehicles, pedestrians, etc.) near the vehicle.

The sensor systems of a vehicle may include, for example, a light detection and ranging (LIDAR) system and a radar system. LIDAR uses laser pulses to measure the distance to and speed of objects that reflect the laser light. Radar uses radio waves to measure the distance to and speed of objects that reflect the radio waves. The data from the LIDAR and radar systems may be used, possibly along with data from other sensors of the vehicle's sensor system, such as cameras, to determine where objects are located in an environment around the vehicle. A particular LIDAR sensor, radar sensor, and/or camera may each have a field of view. The field of view of a sensor may include one or more angular (or other shaped) regions over which the sensor may detect objects and an associated range that corresponds to a maximum distance from the sensor at which the sensor may reliably detect objects in that field of view. In some instances, the associated range may vary for various azimuth/elevation angles within the field of view. Together, the values of the parameters that define this field of view, e.g., values for range, azimuth, and elevation, form a volume that can be referred to as the field of view volume.

The field of view volume of a particular sensor can be considered an accurate representation of a space within which the particular sensor can be deemed to detect objects with high confidence. In other words, one or more processors of the vehicle system (e.g., a chip that controls operation of the sensor, or a processor of the vehicle's control system) can be configured to confidently rely on sensor data acquired within the space defined by the sensor's field of view volume. For example, a processor associated with the particular sensor can be configured to associated a higher confidence level (e.g., higher than a predefined confidence threshold level) to objects or other information detected at a range, azimuth, and/or elevation within that sensor's field of view volume, and can be configured to associate a lower confidence level (e.g., equal to or lower than the predefined confidence threshold level) to objects or other information detected at a range, azimuth, and/or elevation outside of that field of view volume.

A vehicle can be exposed to varying conditions while in operation, such as changes in weather (e.g., fog, rain, snow), changes in the time-of-day, changes in speed limit, changes in terrain or other geographical conditions, changes in settlement (e.g., urban, suburban, rural), changes in the number of other vehicles or objects in close proximity to the vehicle, other changes external to the vehicle, and/or internal changes to the vehicle's systems (e.g., sensor errors, sensor surface cleanliness, vehicle subsystem faults, etc.). At any given point in time, one or more of these or other conditions can be present in the vehicle's operating environment. In the context of the present disclosure, an "operating environment" of a vehicle can be or include one or more conditions internal and/or external to the vehicle that can change over time, including but not limited to the conditions described above and other conditions described elsewhere in this disclosure. Thus, when one or more of such conditions change, the operating environment of the vehicle can change.

In some cases, an operating environment can be associated with a particular geographic location and/or bound by certain geographic limitations. For example, a first operating environment can be associated with a first route between two locations, and a second, different operating environment can be associated with a second route between the same two locations. Thus, when travelling on the first route, the vehicle might operate in accordance with the first operating environment, and when travelling on the second route, the vehicle might operate in accordance with the second operating environment. As another example, a first operating environment can be associated with a first portion of a route between a pickup location and a dropoff location, and a second operating environment can be associated with a second portion of the route between the pickup and dropoff location. As another example, an operating environment can be limited to a geographically-defined area, such as the property lines of an airport, university, or a private residential community. Other examples are possible as well.

The present disclosure is directed towards systems and methods for adjusting the field of view volume of one or more of the vehicle's sensors based on an operating environment of the vehicle (e.g., based on the vehicle system detecting the operating environment or detecting a change of one operating environment to another). This can occur in real-time or in near-real-time as the vehicle system detects, or detects changes to, the operating environment.

As described herein, the act of adjusting a field of view volume for a particular sensor can be performed in various ways. As an example, the act of adjusting the field of view volume for a particular sensor can be performed in response to detecting a change in the operating environment of the vehicle from a first operating environment to a second operating environment, and can thus involve the vehicle system adjusting the field of view volume of the sensor from a first field of view volume that corresponds to the first operating environment to a second, adjusted field of view volume that corresponds to the second operating environment. As another example, the vehicle system can actively decide to switch itself from a mode of operation associated with one operating environment to a mode of operation associated with another operating environment, and the switch can involve or cause a switch from one or more vehicle sensors each operating in accordance with a respective field of view volume to instead each operating with a different respective field of view volume. As another example, the act of adjusting the field of view volume for a particular sensor can involve the vehicle system initially establishing a field of view volume for that sensor, such as by selecting a predetermined field of view volume based on a detected operating environment of the vehicle or by determining the field of view volume using other techniques. In some examples, there can exist a finite/predetermined number of operating environments in which a vehicle may be designed to operate or with which the vehicle may be otherwise associated, and such operating environments, when detected, can be used to determine the field of view volume for one or more of the vehicle's sensors.

In accordance with the present disclosure, a sensor can be configured to operate in accordance with a field of view volume, up to a maximum field of view volume. For example, a LIDAR sensor may be configured to operate up to a maximum field of view range of 200 meters, azimuth of 210 degrees, and elevation of 20 degrees above the horizon and 75 degrees below the horizon, such that the maximum distance from the LIDAR sensor at which the LIDAR sensor data is treated as reliably detecting objects is 200 meters within that azimuth and elevation. In an example, the vehicle may be travelling along a road while operating using the maximum field of view range, such as 200 meters, for one of the LIDAR sensors of the vehicle. However, the vehicle might encounter (or might be predicted to soon encounter) dense fog, which could degrade the LIDAR's sensor capabilities. Thus, a vehicle system (e.g., one or more processors, computing devices, etc.) can determine that the vehicle is operating in (or will soon switch to operate in) a dense-fog weather state and responsively adjust the field of view volume of at least one of the LIDAR sensors (e.g., all of the LIDAR sensors) to instead be a lower field of view range, such as 70 meters, either within the same azimuth and elevation or a different azimuth and elevation. As such, the vehicle thereafter operates such that the maximum distance from the LIDAR sensor(s) at which the LIDAR sensor(s) data is treated as reliably detecting objects is 70 meters. As the fog clears or the vehicle leaves a foggy area, the vehicle system might then readjust (e.g., increase) the field of view volume for the LIDAR sensors. Other examples are possible as well.

In some embodiments, to determine, for a particular sensor, which field of view volume might be most appropriate to fit the current operating environment of the vehicle, the vehicle system might have stored in memory (e.g., in the form of a lookup table) a mapping between different operating environments of the vehicle and corresponding field of view volumes (or specific volume parameters, e.g. ranges) for one or more sensors, sensor types, etc. of the vehicle. These corresponding field of view volumes can be predetermined using various techniques (e.g., sensor data based machine learning, physics-based calculation(s), etc.). Additionally or alternatively, the field of view volumes can be determined in real time in response to determining the operating environment of the vehicle and/or the predetermined field of view volumes can be compared with newly-acquired sensor data to determine whether the predetermined field of view volumes still accurately represent the degree to which the sensors should be relied upon for the determined operating environment.

In some embodiments, the field of view volume for at least one of the vehicle's sensors can be adjusted based on an operational design domain (ODD) for the vehicle. An ODD is defined by or includes the conditions under which a given vehicle or other driving automation system or feature thereof is specifically designed to operate, including, but not limited to, environmental, geographical, and time-of-day restrictions, and/or the requisite presence or absence of certain traffic or roadway characteristics. A vehicle can have multiple ODDs, each of which can include at least one of a geographical condition, a time-of-day condition, a traffic condition, or a roadway condition, and each of which can be associated with a respective predetermined field of view volume for at least one of the vehicle's sensors. Thus, the vehicle system might associate the vehicle with a first ODD (e.g., a clear weather condition), but in response to detecting a change in an operating environment of the vehicle, can instead associate the vehicle with a second, different ODD (e.g., a foggy, rainy, or snowy weather condition), thus causing the vehicle system to operate at least one of the vehicle's sensors using the predetermined field of view volume for the sensor(s) that is associated with the second ODD.

The present disclosure also provides systems and methods that help determine the vehicle's operating environment, particularly weather-based operating environments. In some examples, the vehicle system can receive weather data from one or more servers or other computing devices associated with one or more weather stations. The weather data might identify weather conditions associated with (e.g., present in) a particular geographic region, such as fog, rain, or snow, among other possibilities. Based on this weather data, the vehicle system can determine the vehicle's operating environment and thus determine how to adjust sensor field of view volumes accordingly for the geographic region with which the weather data is associated. In an example, a global computing system or local computing system can collect the weather data and publish the weather data to various vehicle systems, perhaps along with other information as well, such as which sensor adjustments are recommended for a particular geographic region in light of the weather conditions present in that region. Other examples are possible as well.

Implementations of the disclosed systems and methods advantageously enable a vehicle system to adjust accepted sensor data in real time, so as to dynamically adapt to changing conditions during travel and enable the vehicle to accurately and confidently detect objects in its environment continuously. Along similar lines, the disclosed systems and methods advantageously enable the vehicle system to prioritize sensor systems that might be more likely to operate reliably than others and/or sensor data that might be more likely to be relied upon than others, thus enabling the vehicle system to control the vehicle using the most reliable sensor data. For example, the vehicle system may prioritize or enable more power to certain sensor systems or sensor capabilities over others, or may prioritize or enable compute resources to process certain sensor data over others.

II. Example Systems and Devices

Example systems and devices will now be described in greater detail. In general, the embodiments disclosed herein can be used with any system that includes one or more sensors that scan an environment of the system. Illustrative embodiments described herein include vehicles that employ sensors, such as LIDARs, RADARs, SONARs, cameras, etc. However, an example system may also be implemented in or take the form of other devices, such as robotic devices, industrial systems (e.g., assembly lines, etc.), or mobile communication systems or devices, among other possibilities.

The term "vehicle" is broadly construed herein to cover any moving object, including, for instance, an aerial vehicle, watercraft, spacecraft, a car, a truck, a van, a semitrailer truck, a motorcycle, a golf cart, an off-road vehicle, a warehouse transport vehicle, tractor, or a farm vehicle, as well as a carrier that rides on a track such as a roller coaster, trolley, tram, or train car, among other examples. Some vehicles may operate in a fully autonomous mode, where no human interaction is used for operations, a semi-autonomous mode, where no little human interaction is used for operations, or a human-operated mode, where a human operates the vehicle and sensors may aid the human.

In example embodiments, an example vehicle system may include one or more processors, one or more forms of memory, one or more input devices/interfaces, one or more output devices/interfaces, and machine-readable instructions that when executed by the one or more processors cause the system to carry out the various functions, tasks, capabilities, etc., described above. Example systems within the scope of the present disclosure will be described in greater detail below.

FIG. 1 is a functional block diagram illustrating a vehicle 100 according to an example embodiment. The vehicle 100 may be configured to operate fully or partially in an autonomous mode, and thus may be referred to as an "autonomous vehicle." The vehicle may also be configured to be operated by a human, but provide information to the human through the vehicle's sensing systems. For example, a computing system 111 can control the vehicle 100 while in an autonomous mode via control instructions to a control system 106 for the vehicle 100. The computing system 111 can receive information from one or more sensor systems 104, and base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode and a partially-autonomous and/or a fully-autonomous operation mode.

The vehicle 100 includes a propulsion system 102, a sensor system 104, a control system 106, one or more peripherals 108, a power supply 110, a computing system 111, and a user interface 112. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments, the propulsion system 102 includes an engine/motor 118, an energy source 120, a transmission 122, and wheels/tires 124. The engine/motor 118 converts energy source 120 to mechanical energy. In some embodiments, the propulsion system 102 can optionally include one or both of engines and/or motors. For example, a gas-electric hybrid vehicle can include both a gasoline/diesel engine and an electric motor.

The energy source 120 represents a source of energy, such as electrical and/or chemical energy, that may, in full or in part, power the engine/motor 118. That is, the engine/motor 118 can be configured to convert the energy source 120 to mechanical energy to operate the transmission. In some embodiments, the energy source 120 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 120 can also provide energy for other systems of the vehicle 100.

The transmission 122 includes appropriate gears and/or mechanical elements suitable to convey the mechanical power from the engine/motor 118 to the wheels/tires 124. In some embodiments, the transmission 122 includes a gearbox, a clutch, a differential, a drive shaft, and/or axle(s), etc.

The wheels/tires 124 are arranged to stably support the vehicle 100 while providing frictional traction with a surface, such as a road, upon which the vehicle 100 moves. Accordingly, the wheels/tires 124 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 124 of vehicle 100 may be operable to rotate differentially with respect to other wheels/tires 124. The wheels/tires 124 can optionally include at least one wheel that is rigidly attached to the transmission 122 and at least one tire coupled to a rim of a corresponding wheel that makes contact with a driving surface. The wheels/tires 124 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 126, an inertial measurement unit (IMU) 128, a radar unit 130, a laser rangefinder/LIDAR unit 132, a camera 134, and/or a microphone 136. The sensor system 104 could also include sensors configured to monitor internal systems of the vehicle 100 (e.g., $O_2$ monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 126 is a sensor configured to estimate a geographic location of the vehicle 100. To this end, GPS 126 can include a transceiver operable to provide information regarding the position of the vehicle 100 with respect to the Earth.

The IMU 128 can include any combination of sensors (e.g., accelerometers and gyroscopes) configured to sense position and orientation changes of the vehicle 100 based on inertial acceleration.

The radar unit 130 can represent a system that utilizes radio signals to sense objects within the local environment of the vehicle 100. In some embodiments, in addition to sensing the objects, the radar unit 130 and/or the computing system 111 can additionally be configured to sense the speed and/or heading of the objects. The radar unit 130 may include any antenna(s), waveguide networks, communication chip(s), and/or other components that may facilitate radar operation.

Similarly, the laser rangefinder or LIDAR unit 132 can be any sensor configured to sense objects in the environment in which the vehicle 100 is located using lasers. The laser rangefinder/LIDAR unit 132 can include one or more laser sources, a laser scanner, and one or more detectors, among other system components. The laser rangefinder/LIDAR unit 132 can be configured to operate in a coherent (e.g., using heterodyne detection) or an incoherent detection mode.

The camera 134 can include one or more devices configured to capture a plurality of images of the environment surrounding the vehicle 100. The camera 134 can be a still camera or a video camera. In some embodiments, the camera 134 can be mechanically movable such as by rotating and/or tilting a platform to which the camera is mounted. As such, a control process of vehicle 100 may be implemented to control the movement of camera 134.

The sensor system 104 can also include a microphone 136. The microphone 136 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 138, throttle 140, brake unit 142, a sensor fusion algorithm 144, a computer vision system 146, a navigation/pathing system 148, and/or an obstacle avoidance system 150, etc.

The steering unit 138 is operable to adjust the heading of vehicle 100. For example, the steering unit can adjust the axis (or axes) of one or more of the wheels/tires 124 so as to effect turning of the vehicle. The throttle 140 is configured to control, for instance, the operating speed of the engine/motor 118 and, in turn, adjust forward acceleration of the vehicle 100 via the transmission 122 and wheels/tires 124. The brake unit 142 decelerates the vehicle 100. The brake unit 142 can use friction to slow the wheels/tires 124. In some embodiments, the brake unit 142 inductively decelerates the wheels/tires 124 by a regenerative braking process to convert kinetic energy of the wheels/tires 124 to electric current.

The sensor fusion algorithm 144 is an algorithm (or a computer program product storing an algorithm) configured to accept data from the sensor system 104 as an input. The data may include, for example, data representing information sensed at the sensors of the sensor system 104. The sensor fusion algorithm 144 can include, for example, a Kalman filter, Bayesian network, etc. The sensor fusion algorithm 144 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 146 can process and analyze images captured by camera 134 to identify objects and/or features in the environment surrounding vehicle 100. The detected features/objects can include traffic signals, roadway boundaries, other vehicles, pedestrians, and/or obstacles, etc. The computer vision system 146 can optionally employ an object recognition algorithm, a Structure From Motion (SFM) algorithm, video tracking, and/or available computer vision techniques to effect categorization and/or identification of detected features/objects. In some embodiments, the computer vision system 146 can be additionally configured to map the environment, track perceived objects, estimate the speed of objects, etc.

The navigation and pathing system 148 is configured to determine a driving path for the vehicle 100. For example, the navigation and pathing system 148 can determine a series of speeds and directional headings to effect movement of the vehicle along a path that substantially avoids perceived obstacles while generally advancing the vehicle along a roadway-based path leading to an ultimate destination, which can be set according to user inputs via the user interface 112, for example. The navigation and pathing system 148 can additionally be configured to update the driving path dynamically while the vehicle 100 is in operation on the basis of perceived obstacles, traffic patterns, weather/road conditions, etc. In some embodiments, the navigation and pathing system 148 can be configured to incorporate data from the sensor fusion algorithm 144, the GPS 126, and one or more predetermined maps so as to determine the driving path for vehicle 100.

The obstacle avoidance system 150 can represent a control system configured to identify, evaluate, and avoid or otherwise negotiate potential obstacles in the environment surrounding the vehicle 100. For example, the obstacle avoidance system 150 can effect changes in the navigation of the vehicle by operating one or more subsystems in the control system 106 to undertake swerving maneuvers, turning maneuvers, braking maneuvers, etc. In some embodiments, the obstacle avoidance system 150 is configured to automatically determine feasible ("available") obstacle avoidance maneuvers on the basis of surrounding traffic patterns, road conditions, etc. For example, the obstacle avoidance system 150 can be configured such that a swerving maneuver is not undertaken when other sensor systems detect vehicles, construction barriers, other obstacles, etc. in the region adjacent to the vehicle that would be swerved into. In some embodiments, the obstacle avoidance system 150 can automatically select the maneuver that is both available and maximizes safety of occupants of the vehicle. For example, the obstacle avoidance system 150 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 152, a touchscreen 154, a microphone 156, and/or a speaker 158.

In some embodiments, the peripherals 108 function to receive inputs for a user of the vehicle 100 to interact with the user interface 112. To this end, the touchscreen 154 can both provide information to a user of vehicle 100, and convey information from the user indicated via the touchscreen 154 to the user interface 112. The touchscreen 154 can be configured to sense both touch positions and touch gestures from a user's finger (or stylus, etc.) via capacitive sensing, resistance sensing, optical sensing, a surface acoustic wave process, etc. The touchscreen 154 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 156 can be configured to receive audio (e.g., a voice command or other audio input) from a user of the vehicle 100. Similarly, the speakers 158 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 152 can wirelessly communicate with one or more devices directly or via a communication network. The wireless communication system 152 can optionally use 3G cellular communication, such as CDMA, EVDO, GSM/GPRS, and/or 4G cellular communication, such as WiMAX or LTE. Additionally or alternatively, wireless communication system 152 can communicate with a wireless local area network (WLAN), for example, using WiFi. In some embodiments, wireless communication system 152 could communicate directly with a device, for example, using an infrared link, Bluetooth, and/or ZigBee. The wireless communication system 152 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 152 within the context of the present disclosure.

As noted above, the power supply 110 can provide power to components of vehicle 100, such as electronics in the peripherals 108, computing system 111, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 120 can be implemented together, as in some all-electric cars.

Many or all of the functions of vehicle 100 can be controlled via computing system 111 that receives inputs from the sensor system 104, peripherals 108, etc., and communicates appropriate control signals to the propulsion system 102, control system 106, peripherals, etc. to effect automatic operation of the vehicle 100 based on its surroundings. Computing system 111 includes at least one processor 113 (which can include at least one microprocessor) that executes instructions 115 stored in a non-transitory computer readable medium, such as the data storage 114. The computing system 111 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information as map data 116. Such information may be used by vehicle 100 and computing system 111 during operation of the vehicle 100 in the autonomous, semi-autonomous, and/or manual modes to select available roadways to an ultimate destination, interpret information from the sensor system 104, etc.

The vehicle 100, and associated computing system 111, provides information to and/or receives input from, a user of vehicle 100, such as an occupant in a passenger cabin of the vehicle 100. The user interface 112 can accordingly include one or more input/output devices within the set of peripherals 108, such as the wireless communication system 152, the touchscreen 154, the microphone 156, and/or the speaker 158 to allow communication between the computing system 111 and a vehicle occupant.

The computing system 111 controls the operation of the vehicle 100 based on inputs received from various subsystems indicating vehicle and/or environmental conditions (e.g., propulsion system 102, sensor system 104, and/or control system 106), as well as inputs from the user interface 112, indicating user preferences. For example, the computing system 111 can utilize input from the control system 106 to control the steering unit 138 to avoid an obstacle detected by the sensor system 104 and the obstacle avoidance system 150. The computing system 111 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 134 can capture a plurality of images that represent information about an environment of the vehicle 100 while operating in an autonomous mode. The environment may include other vehicles, traffic lights, traffic signs, road markers, pedestrians, etc. The computer vision system 146 can categorize and/or recognize various aspects in the environment in concert with the sensor fusion algorithm 144, the computing system 111, etc. based on object recognition models pre-stored in data storage 114, and/or by other techniques.

Although the vehicle 100 is described and shown in FIG. 1 as having various components of vehicle 100, e.g., wireless communication system 152, computing system 111, data storage 114, and user interface 112, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2:
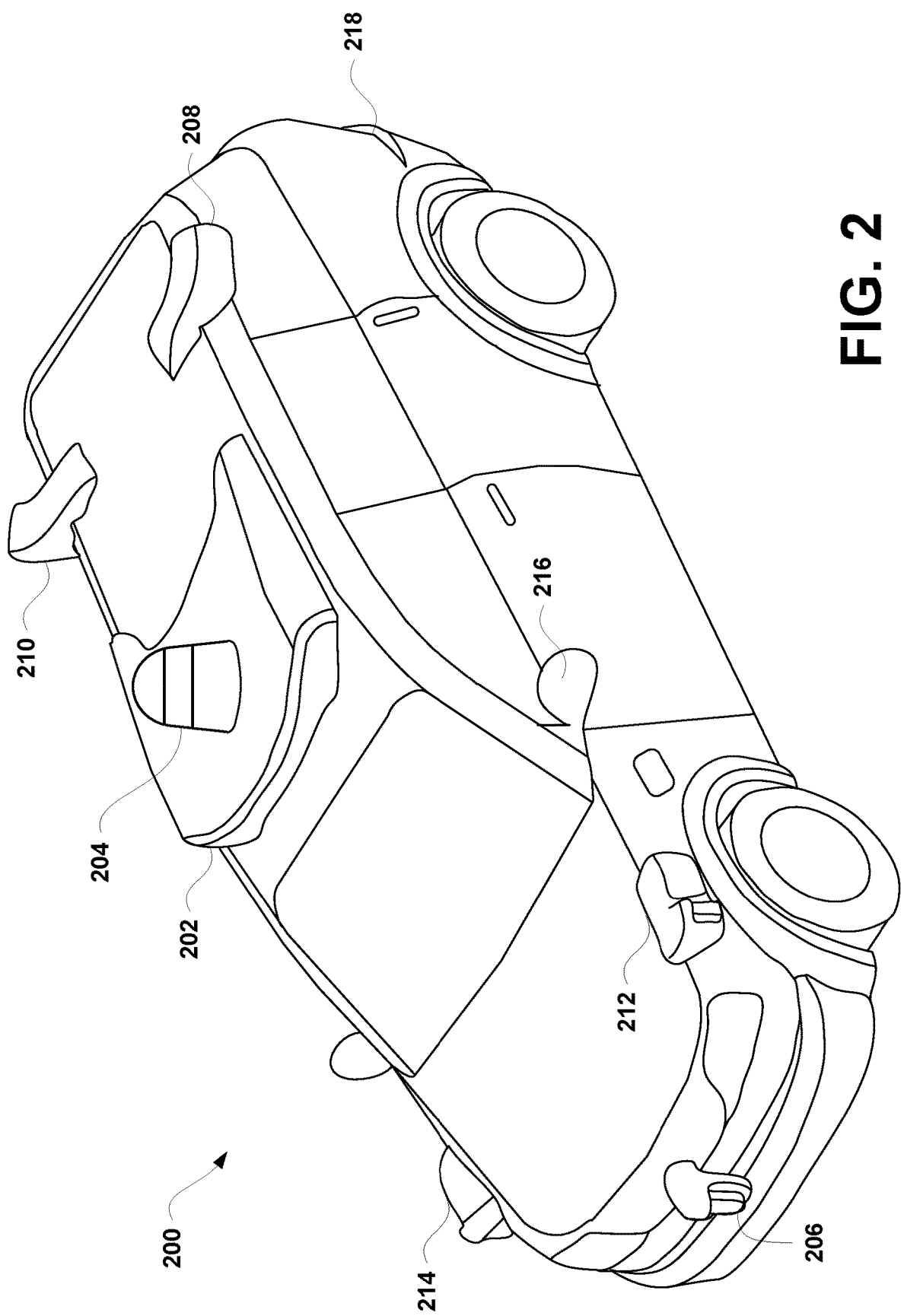
FIG. 2 depicts an exterior view of an example autonomous vehicle.

FIG. 2 shows an example vehicle 200 that can include some or all of the functions described in connection with vehicle 100 in reference to FIG. 1. Although vehicle 200 is illustrated in FIG. 2 as a four-wheel car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar unit 130 and/or laser rangefinder/LIDAR unit 132 in the vehicle 100. Additionally, the first LIDAR/radar unit 212 and second LIDAR/radar unit 214 can actively scan the surrounding environment for the presence of potential obstacles and can be similar to the radar unit 130 and/or laser rangefinder/LIDAR unit 132 in the vehicle 100.

In some examples, the LIDAR units may be one of two different types of LIDAR unit. A first type of LIDAR unit may be a LIDAR that rotates and can continuously scan the full region of the LIDAR unit's field of view. A second type of LIDAR unit may be a LIDAR that can rotate and be steered to scan a specific region of the LIDAR unit's field of view. The first type of LIDAR unit may have a shorter range than the second type of LIDAR unit. The second type of LIDAR unit may have a smaller field of view when operating compared to the first LIDAR unit. In some examples, one or more of the designated LIDAR units of vehicle 200 may contain one or both types of LIDAR unit. For example, LIDAR unit 204 mounted on the top of the vehicle may contain both types of LIDAR units. In one example, the second type of LIDAR unit may have a field of view in operation that is 8-degrees wide in the horizontal plane and 15-degrees wide in the vertical plane.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, although other mounting locations are possible. Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the region in the back of the car 200 for the presence of radio-reflective objects. Similarly, the first LIDAR/radar unit 212 and the second LIDAR/radar unit 214 may be mounted near the front of the vehicle to actively scan a region in front of the vehicle. A radar scanner can be situated, for example, in a location suitable to illuminate a region including a forward-moving path of the vehicle 200 without occlusion by other features of the vehicle 200. For example, a radar scanner can be situated to be embedded and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

In practice, each radar unit may be able to scan over a 90-degree beamwidth. When radar units are placed at the corners of the vehicle, as shown by radar units 208, 210, 212, and 214, each radar unit may be able to scan a 90-degree field of view in the horizontal plane and provide the vehicle with a radar field of view of the full 360-degree area around the vehicle. Further, the vehicle may also include two side-facing radar units. The side-facing radar units may be able to provide further radar imaging when other radar units are obstructed, such as when making a protected right hand turn (i.e., a right-hand turn when there's another vehicle in the lane to the left of the turning vehicle).

Although not shown in FIG. 2, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include dedicated short-range communications (DSRC), radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. In one particular example, the sensor unit 202 may contain both optical cameras (i.e., cameras that capture human-visible light) and infrared cameras. Infrared cameras may be able to capture images of heat within the camera's field of view.

The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

Further, the camera sensor may be configured with a rolling shutter. A rolling shutter generally will iteratively sample the light sensor to capture image data. The data from the camera sensor may form an image, a plurality of images, or a video. For example, in a traditional image sensor, a rolling shutter may iteratively sample the light sensor one row of cells at a time. When sampling a camera sensor that has a rolling shutter, objects in the field of view of the sensor that have a high speed may appear distorted. Such distortions are caused by the iterative sampling. Because lines of cells are sampled iteratively, the object being imaged moves slightly between each sampling. Therefore, each line will be sampled a slightly later time than the previous line. Due to the delay in sampling respective lines an object having horizontal motion may have a horizontal skew. For example, a vehicle moving across the field of view of the sensor may have a horizontal skew and vertical compression (or expansion) that distorts the vehicle. This skew may be troublesome for processing based on the horizontal location of objects in an image. The present system may help identify possible camera distortions caused by a rolling shutter.

Figure 3:
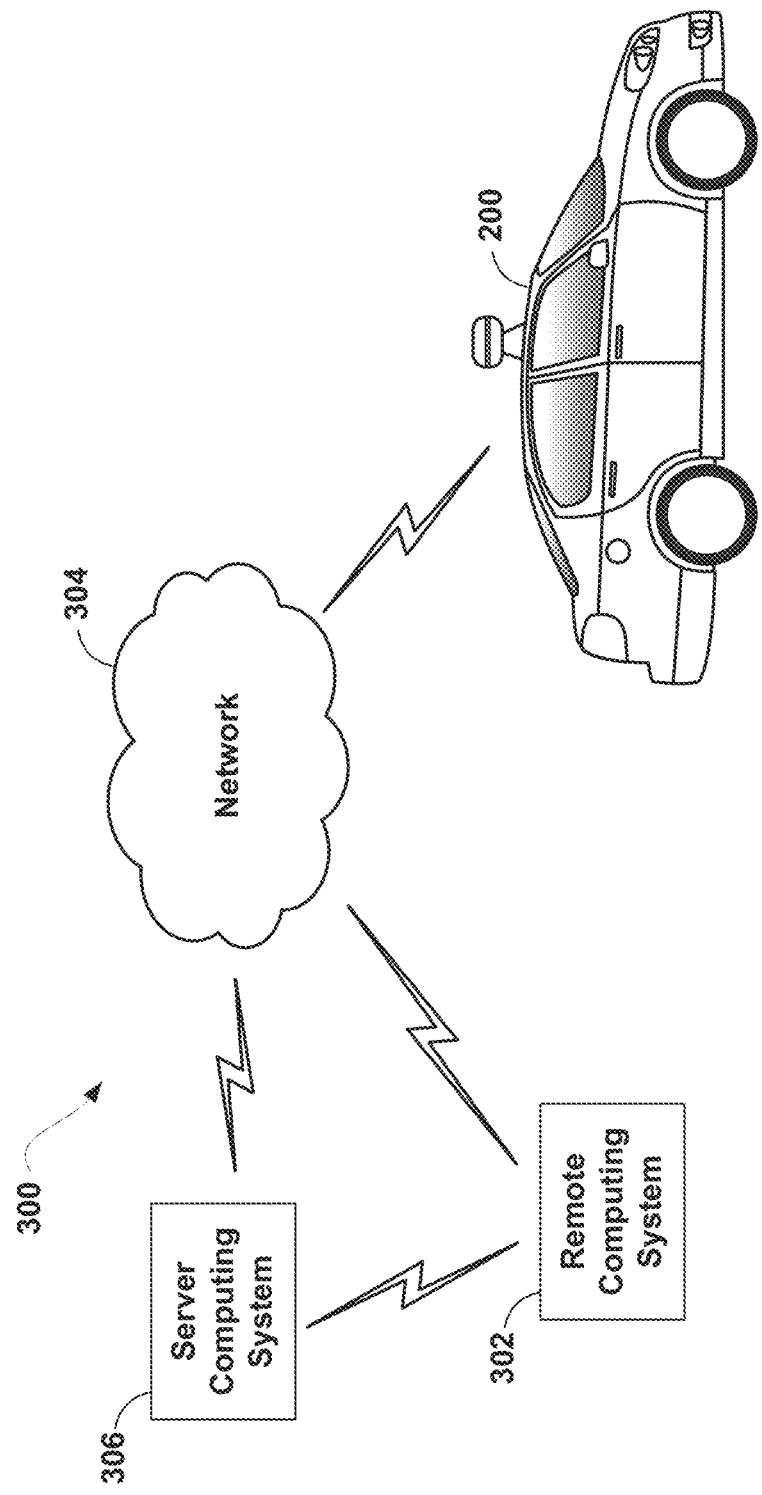
FIG. 3 is a conceptual illustration of wireless communication between various computing systems related to an autonomous vehicle.

FIG. 3 is a conceptual illustration of wireless communication between various computing systems related to an autonomous vehicle, according to an example implementation. In particular, wireless communication may occur between remote computing system 302 and vehicle 200 via network 304. Wireless communication may also occur between server computing system 306 and remote computing system 302, and between server computing system 306 and vehicle 200. During the operation of the vehicle 200, the vehicle may send and receive data from both the server computing system 306 and remote computing system 302 to aid in the operation of the vehicle 200. The vehicle 200 may communicate data related to its operation and data from its sensors to the server computing system 306 and the remote computing system 302. Additionally, the vehicle 200 may receive operational instructions and/or data related to objects sensed by the vehicle's sensors from the server computing system 306 and remote computing system 302.

Vehicle 200 can correspond to various types of vehicles capable of transporting passengers or objects between locations, and may take the form of any one or more of the vehicles discussed above.

Remote computing system 302 may represent any type of device related to remote assistance and operation techniques, including but not limited to those described herein. Within examples, remote computing system 302 may represent any type of device configured to (i) receive information related to vehicle 200, (ii) provide an interface through which a human operator or computer operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some implementations, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some implementations, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some implementations of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, or perhaps server computing system 306, or a computing system local to vehicle 200) may operate to use a camera to capture images of the environment of an autonomous vehicle. In general, at least one computing system will be able to analyze the images and possibly control the autonomous vehicle.

In some implementations, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a radar unit may be configured to transmit an electromagnetic signal that reflects off one or more objects near the vehicle. The radar unit may then capture electromagnetic signals that reflect off the objects. The captured reflected electromagnetic signals may enable the radar system (or processing system) to make various determinations about objects that reflected the electromagnetic signal. For example, the distance and position to various reflecting objects may be determined. In some implementations, the vehicle may have more than one radar in different orientations. In practice, a vehicle may have six different radar units. Additionally, each radar unit may be configured to steer a beam to one of four different sectors of the radar unit. In various examples, the radar unit may be able to scan a beam over a 90-degree range, by scanning each of the four different sectors of the radar unit. The radar system may be configured to store captured information to a memory for later processing by a processing system of the vehicle. The information captured by the radar system may be environment data.

In another example, a laser range finder (e.g., LIDAR unit) may be configured to transmit an electromagnetic signal (e.g., light, such as that from a gas or diode laser, or other possible light source) that may reflect off one or more target objects near the vehicle. The laser range finder may be able to capture the reflected electromagnetic (e.g., laser) signals. The captured reflected electromagnetic signals may enable the range-finding system (or processing system) to determine a range to various objects, such as the objects that reflected the electromagnetic signals back to the laser range finder. The range-finding system may also be able to determine a velocity or speed of target objects and store it as environment data.

In some implementations, the processing system may be able to combine information from the various sensors in order to make further determinations of the environment of the vehicle. For example, the processing system may combine data from both radar information and a captured image to determine if another vehicle or pedestrian is in front of the autonomous vehicle. In other implementations, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle.

The vehicle may detect objects of the environment in various ways depending on the source of the environment data. In some implementations, the environment data may come from a camera and be image or video data. The vehicle may analyze the captured image or video data to identify objects in the image or video data. In other implementations, the environment data may come from a LIDAR unit. The methods and apparatuses may be configured to monitor image and/or video data for the presence of objects of the environment. In other implementations, the environment data may be radar, audio, or other data. The vehicle may be configured to identify objects of the environment based on the radar, audio, or other data.

In some implementations, the techniques the vehicle uses to detect objects may be based on a set of known data. For example, data related to environmental objects may be stored to a memory located in the vehicle. The vehicle may compare received data to the stored data to determine objects. In other implementations, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

III. Example Vehicle Sensor Fields of View

Figure 4:
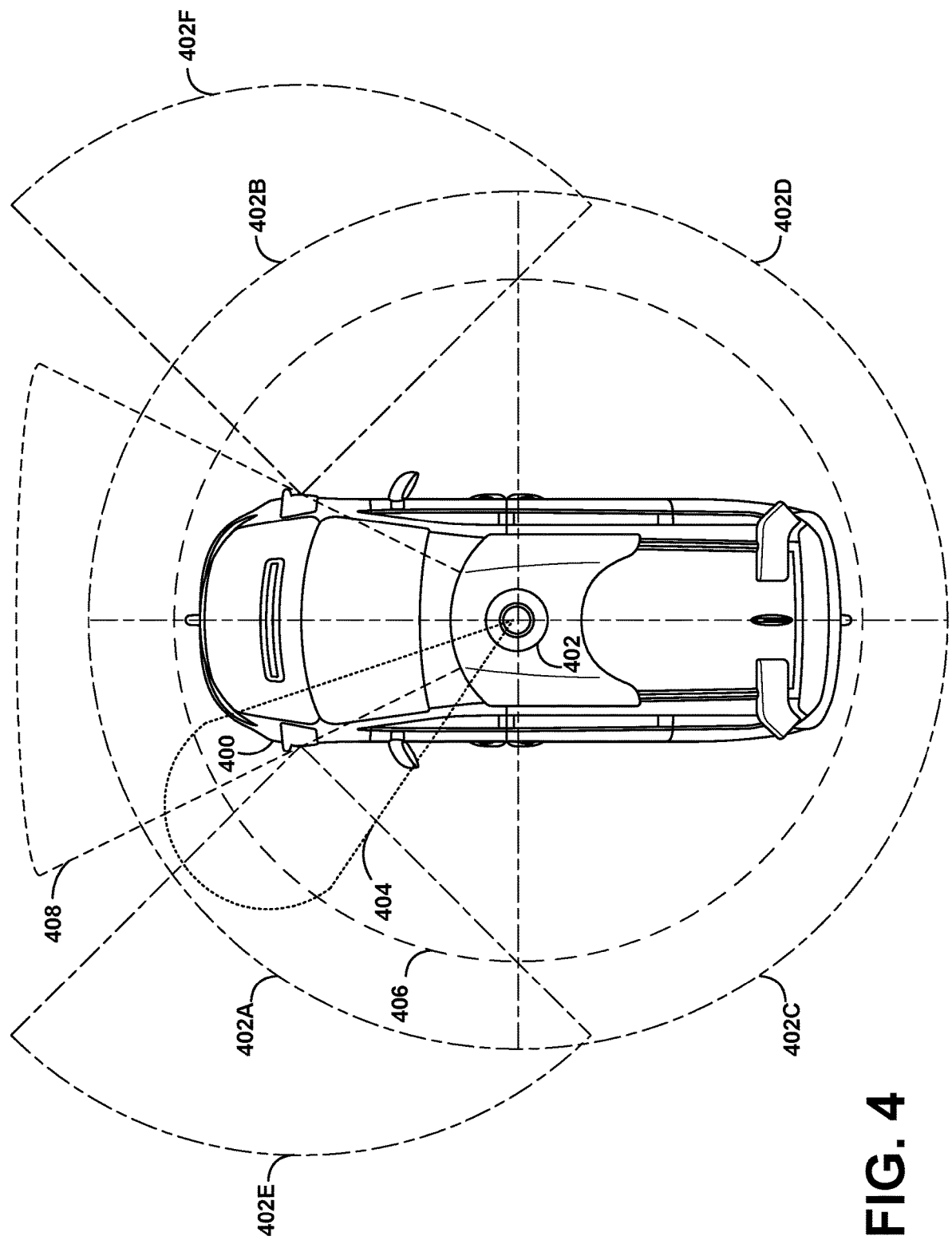
FIG. 4 illustrates one example set of sensor field of view.

FIG. 4 illustrates an example autonomous vehicle 400 having various sensor fields of view. As previously discussed with respect to FIG. 2, a vehicle 400 may contain a plurality of sensors. The locations of the various sensors may correspond to the locations of the sensors disclosed in FIG. 2. However, in some instances, the sensors may have other locations. Sensors locations are omitted from FIG. 4A for simplicity of the drawing. For each sensor unit of vehicle 400, FIG. 4A shows a respective field of view. The field of view of a sensor may include an angular region over which the sensor may detect objects and a range that corresponds to maximum distance from the sensor at which the sensor may reliably detect objects.

As previously disclosed, a vehicle 400 may include six radar units. A first radar unit may be located on the front-left of the vehicle and have an angular field of view corresponding to the angular portion of field of view 402A. A second radar unit may be located on the front-right of the vehicle and have an angular field of view corresponding to the angular portion of the field of view 402B. A third radar unit may be located on the rear-left of the vehicle and have an angular field of view corresponding to the angular portion of field of view 402C. A fourth radar unit may be located on the rear-right of the vehicle and have an angular field of view corresponding to the angular portion of field of view 402D. A fifth radar unit may be located on the left side of the vehicle and have an angular field of view corresponding to the angular portion of field of view 402E. A sixth radar unit may be located on the right side of the vehicle and have an angular field of view corresponding to the angular portion of field of view 402F. Each of the six radar units may be configured with a scannable beamwidth of 90 degrees. A radar beamwidth may be smaller than 90 degrees, but each radar unit may be able to steer the radar beam across the 90-degree field of view.

A first LIDAR unit of the vehicle 400 may be configured to scan the full 360-degree region around the vehicle as shown by an angular field of view corresponding to the angular portion of field of view 404. A second LIDAR unit of the vehicle 400 may be configured to scan a region smaller than the 360-degree region around the vehicle. In one example, the second LIDAR unit may have an 8-degree field of view in the horizontal plane as shown by an angular field of view corresponding to the angular portion of field of view 404.

Additionally, the vehicle may also include at least one camera. The camera may be an optical camera and/or an infrared camera. The camera may have an angular field of view corresponding to the angular portion of field of view 408.

In addition to the field of view for each of the various sensors of vehicle 400, each sensor may also have a corresponding range. In one example, the range of the radar units may be greater than the range of either LIDAR unit, as shown by the field of the views of the radar units 402A-402E extending further than the fields of view for the LIDAR units 404 and 406. Additionally, the first LIDAR unit may have a range that is greater than a range of the second LIDAR unit, as shown by field of view 404 extending further than field of view 406. The camera may have a range shown by the extent of the field of view 408. In various examples, the range of the camera may be greater than or less than the range of the other sensors. It should be understood that the sensor fields of view, radar units, etc. of FIG. 4 are depicted as an example illustration and are not to scale.

IV. Example Systems and Methods

Example systems and methods of the present disclosure will now be described in more detail.

Figure 5:
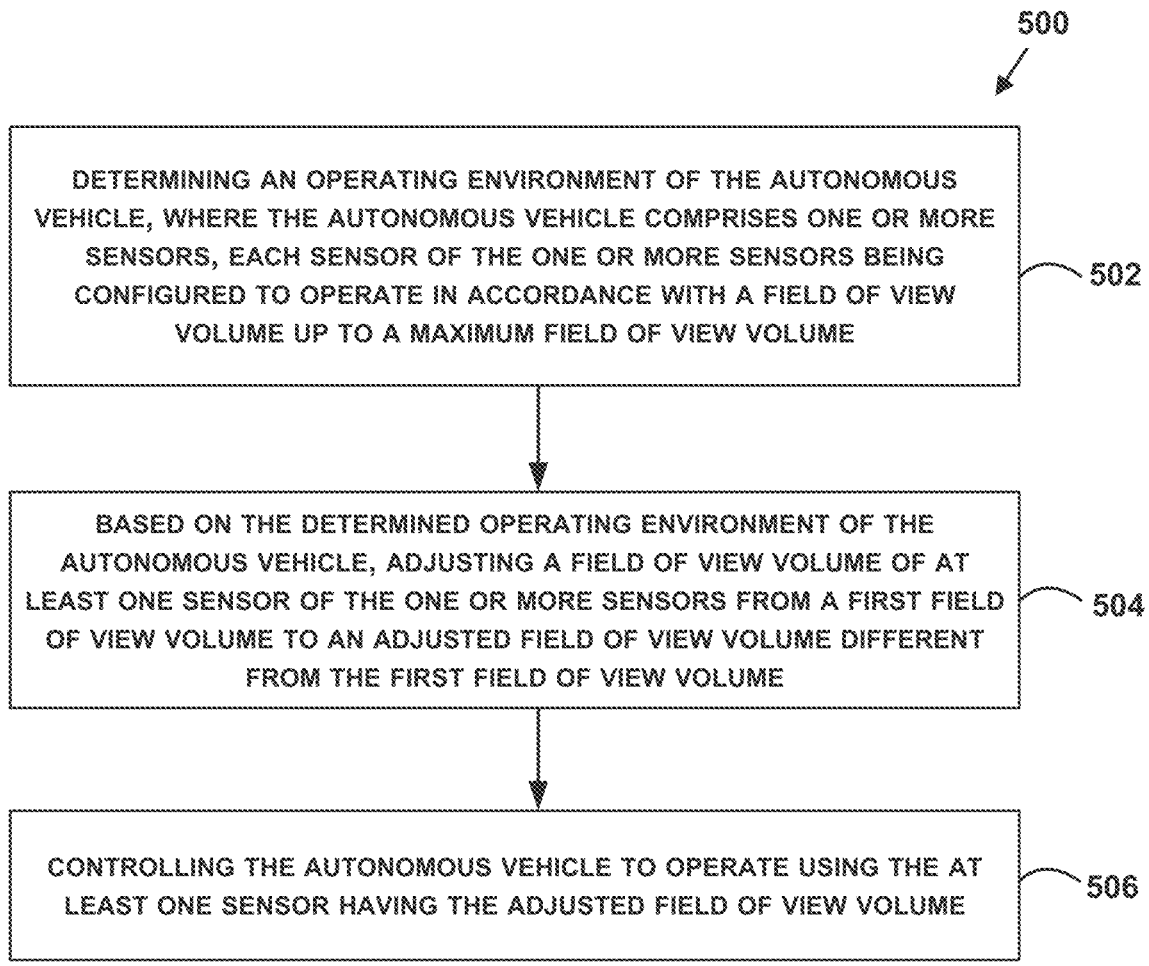
FIG. 5 illustrates an example method.

FIG. 5 is a flowchart of a method 500, according to an example embodiment. Method 500 may include one or more operations, functions, or actions as illustrated by one or more of blocks 502-506. Although the blocks of each method are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500, and other processes and methods disclosed herein, the flowcharts show functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Additionally or alternatively, for the method 500, and other processes and methods disclosed herein, one or more blocks in the flowchart may represent circuitry that is wired to perform the specific logical functions in the process.

In some examples, for the method 500, and other processes and methods disclosed herein, the functions described in the flowchart may be performed by a single vehicle (e.g., vehicle 100, 200, etc.), distributed between multiple vehicles, performed by a remote server/external computing system (e.g., systems 302 and 306), and/or performed by a combination of one or more external computing systems and one or more vehicles, among other possibilities.

At block 502, method 500 involves determining an operating environment of the autonomous vehicle, where the autonomous vehicle comprises one or more sensors, each sensor of the one or more sensors being configured to operate in accordance with a field of view volume.

At block 504, the method involves based on the determined operating environment of the autonomous vehicle, adjusting a field of view volume of at least one sensor of the one or more sensors from a first field of view volume to an adjusted field of view volume different from the first field of view volume.

At block 506, the method involves controlling the autonomous vehicle to operate using the at least one sensor having the adjusted field of view volume.

As discussed above, the one or more sensors of the autonomous vehicle can include a set of one or more LIDAR sensors, a set of one or more radar sensors, and/or a set of one or more cameras (operating in various wavelength bands including visible and infrared), among other possible sensor types. In practice, all sensors of a particular type may be configured to have the same maximum field of view volume such that vehicle software that receives and processes sensor data is configured to treat all sensors of the particular type as having the maximum field of view volume. For example, all radar sensors of the vehicle can have a maximum field of view range of 220 meters and all LIDAR sensors of the vehicle can have a maximum field of view range of 200 meters. Along these lines, the act of adjusting a field of view volume for at least one of the vehicle's sensors can involve making the same field of view adjustment to each sensor of a particular sensor type. For example, if the vehicle system determines an adjustment to make to LIDAR sensors based on the vehicle's operating environment, the vehicle system may make the adjustment to all of the vehicle's LIDAR sensors. Other examples are possible as well. Further, in alternative embodiments, sensor field of view volumes can be configured individually, such that a sensor of a particular sensor type can be configured to have a different maximum field of view volume than another sensor of the same sensor type.

At a given point in time, the vehicle may be configured to operate in one of a plurality of different operating environments, each of which can include one or more conditions internal and/or external to the vehicle. (The term "state" or "operating state" may hereinafter be used interchangeably with the term "operating environment" to refer to an operating environment that is defined by at least one condition.)s. For example, the vehicle's operating environment can be or include one or more of: (i) a default state (e.g., a state defined as involving an environment of operation different from other environments listed herein, where the vehicle operates according to predetermined default parameters for speed, steering, navigation, and/or sensor field of view, among others), (ii) a clear weather state (e.g., sunny, not overcast, no rain, snow, or fog), (iii) a daytime operation state (e.g., a period of time ranging from sunrise to sunset), (iv) a nighttime operation state (e.g., a period of time ranging from sunset to sunrise), (v) a rainy weather state, (vi) a snowy weather state, (v) a foggy weather state, (viii) a state for a particular type of a road on which the autonomous vehicle is travelling (e.g., urban road, suburban road, rural road, local street, highway, gravel, brick, asphalt, and/or concrete), (ix) a state in which at least a threshold quantity of vehicles are on the road within a threshold distance from the autonomous vehicle (e.g., seven or more vehicles within 16 meters of the vehicle), (x) an overcast state (e.g., more clouds and less light), (xi) a sensor cleanliness state in which the vehicle has detected that one or more sensors of the vehicle have dirt, water droplets, ice/ frost, bug splat, oil, road grime, or another substance obstructing their covers/windows or other surface, (xii) a light traffic state, (xiii) a medium traffic state, (xiv) a heavy traffic state, or (xv) a state in which at least one sensor of the one or more sensors has a sensor error (e.g., where one or more LIDAR sensors are producing an error code indicating inoperability of the sensor(s) or another indication that might affect the reliability of measurements obtained via the sensor(s)). Other operating environments are possible.

As discussed above, an operating environment can be or include a combination of conditions. For example, an operating environment can be a clear weather, sunny, daytime operation state (e.g., 11:00 AM and sunny). As another example, an operating environment can be a clear weather, daytime, uphill terrain, asphalt road, heavy traffic state. In some examples, the default state can consist of one or more other states, such as the clear weather state and a state in which the vehicle is driving on asphalt or concrete. Furthermore, in some examples, the default state can have, as its corresponding field of view volumes, the maximum field of view volumes for each sensor type. Moreover, in some examples, there may be operating environments having varying degrees of weather conditions, such as a severe snowstorm and/or wind, severe rain and/or wind, or fog density exceeding a predefined threshold, among other possibilities.

In some situations, operating environments that affect the field of view volume of one type of sensor might or might not affect the field of view volume(s) of other types of sensors. For example, the vehicle system might reduce the field of view range for the LIDAR sensors in foggy weather at night and use the fog/night operating environment information to reduce the field of view range that one or more of the vehicle's cameras can detect a target that has a particular contrast (e.g., a gray car in fog). As another example, a large reflection from a highway sign (retroreflector) might cause the vehicle system to adjust the field of view range for a LIDAR sensor in a particular way, but the large reflection might not cause the vehicle system to adjust the field of view range at which the camera(s) can detect objects. Other examples are possible as well.

To facilitate the act of adjusting the sensor field of view volume for at least one of the one or more sensors, the vehicle system may store in memory (e.g., data storage 114) a plurality of operating environments and a mapping between each operating environment of the plurality of operating environments and a corresponding adjusted field of view volume for the at least one sensor of the one or more sensors. In such embodiments, the act of adjusting the field of view volume based on the operating environment of the autonomous vehicle may involve selecting the corresponding adjusted field of view volume for the determined operating environment of the autonomous vehicle. In some embodiments, the corresponding adjusted field of view volume for a particular operating environment can be part of a set of adjusted field of view volumes that correspond to the operating environment and that comprise a respective adjusted field of view volume for each of a plurality of sensor types (e.g., LIDAR, radar, camera, and/or others). The stored operating environments and the mapping can take various forms, such as a table.

Figure 6:
FIG. 6 depicts one example mapping of a sensor field of view parameter (range) to operating environments.

FIG. 6 depicts, in the form of table 600, one example mapping of a sensor field of view parameter (i.e., range, in this example) to example operating environments. As shown, for each of the eight representative examples of operating environments, the table 600 includes a corresponding respective field of view range for each of three sensor types: LIDAR, radar, and camera. In some examples, using the table 600, the vehicle system may detect foggy weather, determine that the vehicle is operating in a foggy weather operating environment, and responsively select the field of view range values that are mapped to the foggy weather operating environment for use. Specifically, the vehicle system having a set of LIDAR sensors, a set of radar sensors, and a set of cameras may cause all LIDAR sensors to have a field of view range of 50 meters, all radar sensors to have a field of view range of 70 meters, and all cameras to have a field of view range of 120 meters. In foggy weather during daytime operation, cameras may be more reliable than LIDAR sensors, whereas at night, LIDAR sensors might be more reliable due to headlights scattering back at the vehicle.

As another example, the vehicle system may detect an error with at least one camera of the set of cameras and select one or more field of view volume parameters (e.g., range, azimuth, and/or elevation) based on the detection. For instance, the vehicle system may detect camera error based on a determination that one or more images acquired by at least one of the cameras is below an expected acutance, coarseness, and/or other measurement of an ability to discern detail beyond a particular distance (e.g., a reference street sign that we expect to see with high contrast from more than 50 meters away is not discernable in an image). As such, the vehicle system might responsively switch to determine its operating environment to be an error state in which it may ignore all readings from all cameras. Alternatively, there may be variations on the operating environments in which sensors are less trustworthy that, instead of ignoring all readings from such sensors, the vehicle system may use a reduced field of view range, azimuth, and/or elevation for such sensors. For example, if the vehicle system estimates that camera images are low contrast beyond approximately 10 meters and LIDAR readings are anomalous beyond 50 meters, the vehicle system might reduce the field of view range of all cameras to 70 meters and additionally reduce the field of view of all LIDAR sensors to 50 meters. To facilitate this and other examples, there may be additional or alternative sensor error operating environments relative to those shown in FIG. 6. Other examples are possible as well.

In alternative embodiments, the vehicle system might use only the field of view volume parameter values from the mapping for a subset of sensors of a particular type. For instance, in foggy weather, the vehicle system may use a first field of view range of 50 meters for the first LIDAR unit of the vehicle shown in FIG. 4, but may use the default field of view range of 200 meters for the second LIDAR unit of the vehicle. In other alternative embodiments, the vehicle system might only use the sensor field of view volume parameter values for a subset of sensor types. For instance, in foggy weather, the vehicle system may use a reduced field of view range for LIDAR and camera sensors, but may leave the field of view range for radar unchanged (e.g., at the default of 220 meters). Other examples are possible as well, including mappings for more or less sensor types.

Additionally or alternatively to sensor types being mapped to corresponding adjusted field of view volume parameter values, the stored mapping described above or a separate mapping stored in the memory might map the sensor types to other information that relates to sensor field of view and affects what sensor data sensors might acquire. For example, the stored mapping might map the sensor types to power levels that certain sensors might use when acquiring sensor data.

As a more specific example, for a LIDAR sensor, the stored mapping might map a LIDAR sensor type to a power level of a laser pulse transmitted by the LIDAR sensor in acquiring LIDAR data. In embodiments where the mapping is stored and/or in other embodiments where the stored mapping might not be used, the act of adjusting the field of view volume of the at least one sensor from the first field of view volume to the adjusted field of view volume different from the first field of view volume can involve adjusting a power level of a laser pulse transmitted by the LIDAR sensor in acquiring sensor data from a first power level to an adjusted power level different from the first power level and associated with the adjusted field of view volume. Furthermore, the act of controlling the autonomous vehicle to operate using the at least one sensor having the adjusted field of view volume can involve controlling the LIDAR sensor to acquire sensor data by transmitting one or more laser pulses having the adjusted power level associated with the adjusted field of view volume. For example, the power level for transmitting laser pulses can be reduced when lasing larger retroreflector targets after the retroreflector targets are detected. As another example, the power level can be increased in foggy conditions, such as when the vehicle system is observing a narrow field-of-view. Other examples are possible as well. A particular adjusted power level can be associated with the adjusted field of view volume in various ways. For example, the mapping stored by the vehicle system can map, for a particular adjusted range, azimuth, or elevation of the adjusted field of view volume, a respective corresponding adjusted power level at which transmissions can occur to acquire (or acquire and ignore, discard, identify, etc.) sensor data corresponding to the adjusted range, azimuth, or elevation. Other examples are possible as well.

As another specific example, for a radar sensor, the stored mapping might map a radar sensor type to a particular radio wave characteristic (e.g., shape, amplitude, bandwidth, duration) of radio waves transmitted by the radar sensor in acquiring radar data. For the purposes of example, the transmit power at which radio waves are transmitted, as well as any transmit or receive beamforming performed by the vehicle's radar system, can be considered to be radio wave characteristics as well. In embodiments where the stored mapping such as these are stored and/or in other embodiments where the stored mapping might not be used, the act of adjusting the field of view volume of the at least one sensor from the first field of view volume to the adjusted field of view volume different from the first field of view volume can involve adjusting a radio wave characteristic of radio waves transmitted by the radar sensor in acquiring sensor data, such as by adjusting a characteristic (e.g., transmit power) from a first value to an adjusted value different from the first value or by adjusting the characteristic in another manner. Furthermore, the act of controlling the autonomous vehicle to operate using the at least one sensor having the adjusted field of view volume can involve controlling the radar sensor to acquire sensor data by transmitting one or more radio waves having the adjusted radio wave characteristic associated with the adjusted field of view volume. Other examples are possible as well. A particular adjusted radio wave characteristic can be associated with the adjusted field of view volume in various ways. For example, the mapping stored by the vehicle system can map, for a particular adjusted range, azimuth, or elevation of the adjusted field of view volume, a respective corresponding adjusted radio wave characteristic at which transmissions can occur acquire (or acquire and ignore, discard, identify, etc.) sensor data corresponding to the adjusted range, azimuth, or elevation. Other examples are possible as well.

In a more particular example of how the vehicle system can adjust radar sensor field of view volume, in an operating environment of heavy rain, the vehicle system (or a sensor chip for controlling radar) can reduce radar azimuth scan to reduce the field of view volume, and can also direct more antenna gain in the forward direction to improve penetration through the rain. As another example, in a dense urban environment, the vehicle system (or a sensor chip for controlling radar) can cause a radar sensor to transmit less power at a particular angle corresponding to a large retroreflector-like target, so as to improve the radar sensor's ability to detect small targets in the vicinity of the large retroreflector-like target. As another example, when there are water droplets on a radome of the vehicle, the vehicle system (or a sensor chip for controlling radar) can cause a radar sensor to transmit more power, so as to compensate for the water droplets and reach a range that the radar sensor would be able to reach if the radome was dry. Other examples as possible as well.

In some embodiments, even though a range, azimuth, and/or elevation of a sensor's field of view volume can be adjusted to a value that is less than the maximum field of view value for that sensor and parameter, the sensor might still be configured to acquire and transmit to the vehicle system (e.g., to a processor configured to process the sensor data) sensor data corresponding to a range, azimuth, and/or elevation beyond a respective range, azimuth, and/or elevation associated with the adjusted field of view volume. In such embodiments, such as when controlling the vehicle to operate using the sensor having the adjusted field of view volume, the vehicle system may ignore (e.g., discard, or store but not use as a basis for making determinations about the environment of the vehicle, such as object detections) sensor data corresponding to a range, azimuth, and/or elevation that is greater than a respective range, azimuth, and/or elevation associated with the adjusted field of view volume. For example, if a LIDAR sensor's range has been reduced from 200 meters to 150 meters, the vehicle system may ignore sensor data corresponding to distances from the vehicle that exceed 150 meters. Other examples are possible as well. Additionally or alternatively, the vehicle system may identify (e.g., flag, or otherwise store an indication in memory that data is potentially suspect) sensor data corresponding to a parameter value greater than a maximum parameter value of the adjusted field of view volume. In alternative embodiments, such a sensor might be configured such that the sensor can set itself to not acquire sensor data corresponding to ranges, azimuths, and/or elevations beyond the respective ranges, azimuths, and/or elevations associated with the adjusted field of view volume. Additionally or alternatively, the sensor might be configured to acquire sensor data corresponding to ranges, azimuths, and/or elevations beyond the respective ranges, azimuths, and/or elevations associated with the adjusted field of view volume, but further configured to discard such sensor data, so as to reduce the amount of data transmitted from the sensor to other computing devices of the vehicle system.

The act of controlling the vehicle to operate using the at least one sensor having the adjusted field of view volume can involve controlling the vehicle to operate in an autonomous mode using the at least one sensor having the adjusted field of view volume—that is, controlling the vehicle, while operating in the autonomous mode, to acquire sensor data using the at least one sensor based on the adjusted field of view volume. To facilitate this in some embodiments, a local computing system onboard the vehicle can set itself to ignore sensor data readings acquired during operation of the vehicle that exceed the respective range, azimuth, and/or elevation associated with the adjusted field of view volume for each of the at least one sensor. Additionally or alternatively, a remote system can transmit an instruction to the local computing system of the vehicle that, upon receipt by the local computing system, causes the local computing system to control the vehicle to operate in an autonomous mode in which the local computing system ignores sensor data readings that exceed the respective range, azimuth, and/or elevation associated with the adjusted field of view volume for each of the at least one sensor. Other examples are possible as well.

In some embodiments, the vehicle's sensors and associated computing devices, such as a chip (e.g., microchip) that controls operation of one or more sensors, can perform operations before the sensors transmit acquired sensor data to the onboard computer or remote computer, which can affect how the onboard computer or remote computer control operation of the vehicle. In particular, such a sensor chip can perform one or more operations of the method 500 (or method 800, described in more detail later in this description). For example, the sensor chip can be configured to determine the operating environment of the vehicle based on acquired sensor data (in the same or similar ways as discussed in more detail below) and responsively adjust the field of view volume for one or more sensors. In this context, the act of adjusting the field of view volume can involve the sensor chip ignoring or flagging sensor data corresponding to ranges, azimuths, and/or elevations greater than the respective ranges, azimuths, and/or elevations associated with the adjusted field of view volume. Additionally or alternatively, the act of adjusting the field of view volume can involve the sensor chip (i) adjusting a power level of a laser pulse transmitted by one or more LIDAR sensors in acquiring sensor data from a first power level to an adjusted power level different from the first power level and/or (ii) acquiring sensor data by transmitting one or more laser pulses at the adjusted power level associated with the adjusted field of view volume. Additionally or alternatively, the act of adjusting the field of view volume can involve the sensor chip (i) adjusting a characteristic of radio waves transmitted by one or more radar sensors in acquiring sensor data (e.g., from a first value to an adjusted value different from the first value) and/or (ii) acquiring sensor data by transmitting one or more radio waves having the adjusted radio wave characteristic associated with the adjusted field of view volume. Other examples are possible as well.

The act of the vehicle system determining the operating environment of the vehicle can occur in various ways. As a general matter, the act might involve the vehicle system receiving information associated with a surrounding environment of the vehicle (e.g., objects detected on the road, weather data detected by various sensors, etc.), information associated with ongoing operation of the vehicle and its components (e.g., sensor error codes), and/or information input by a user (e.g., a driver of the vehicle) via user interface 112. For example, one or more of the vehicle's sensors might acquire sensor data and the vehicle system might determine, using the sensor data, a weather condition for a particular location along the route of travel of the vehicle. The vehicle system can then use the determined weather condition(s) as a basis for determining the operating environment of the vehicle. As a more specific example, one or more of the vehicle's sensors might acquire sensor data that the vehicle system is configured to interpret as an indication of sunlight (thus indicating daytime) and rainy weather and, in response to acquiring and analyzing the sensor data, the vehicle system may determine that the vehicle is operating in a rainy weather state. For instance, the vehicle system can be configured to determine a weather condition by looking at backscattered light from the LIDAR laser pulses hitting raindrops or snowflakes or fog droplets. Similarly, a radar sensor of the vehicle might acquire sensor data and, from this data, the vehicle system can infer what type of rain condition (e.g., light, medium, heavy) is present in the environment based on the amount/distribution/Doppler-shift of backscattered radar energy from droplets in the air. As another example of determining the operating environment, a camera of the vehicle might acquire one or more images and, from the image(s), the vehicle system can infer a fog condition (e.g., dense, fine, etc.) based on the amount of contrast degradation to a known target (e.g., prior information stored onboard) at a particular range.

As another specific example, a driver, remote assistant, or passenger of the vehicle might know (e.g., based on a weather forecast) that a snow storm is going to start soon and might provide input data (e.g., via a touchscreen GUI onboard the vehicle) indicative of a command for the vehicle to begin operating in a snowy weather state. Thus, in response to receiving the input data, the vehicle system can control the vehicle to begin operating in the snowy weather state, which can also take the form of the vehicle system's determination that the vehicle is operating in the snowy weather state. As an even more specific variation of this example, the vehicle system might have access to a predetermined 3D map of the surrounding environment of the vehicle, such as a 3D map that shows a stop sign that the vehicle is approaching. The vehicle system can be configured to compare the predetermined 3D map to sensor data that is acquired by the vehicle's sensors in real time and determine the operating environment of the vehicle based on the comparison. For example, the 3D map might clearly show the stop sign, but cameras or LIDAR sensors of the vehicle might acquire sensor data where the stop sign is not as clearly visible, which the vehicle system might be configured to interpret, depending on the nature of the differences determined in the comparison, as a particular type of weather condition, such as snow. Other examples are possible as well.

As yet another specific example, as discussed above, the vehicle system might receive sensor data acquired by one or more of the vehicle's sensors and determine, based on the sensor data, a sensor error for at least one of the vehicle's sensors (e.g., based on an anomalous sensor reading falling outside a predefined threshold sensor reading range). Using the sensor error, the vehicle system can determine that the vehicle is operating in a particular sensor error state. Other examples are possible as well.

In some embodiments, the vehicle system can be configured to determine the operating environment of the vehicle based on weather conditions associated with specific locations along a route of travel of the vehicle. To facilitate this, the vehicle system may receive weather data indicating a weather condition for a particular location along the route of travel of the vehicle and, based on the weather condition indicated by the received weather data, the vehicle system may determine the operating environment of the vehicle. The weather condition can take the form of any one or more weather conditions described herein and/or or other possible weather conditions. The particular location can be represented in the weather data in various forms. As a general matter, the location can be dynamic (e.g., the vehicle's current location along the route of travel) or static (e.g., the vehicle's destination or a location along the way to the destination). Furthermore, the location can be a circular region having a particular radius and centered on a particular landmark (e.g., a circular region having an 8 kilometer radius and centered on a city center of a city). Other boundaries of the region are possible as well, such as a city and its boundaries denoted on a predetermined map.

In some embodiments, the vehicle system may receive the weather data from a weather station server or other type of server. The weather station server can be a weather station server that is local to the particular location—that is, a weather station server that is dedicated to the particular location and configured to acquire weather data corresponding to the particular location and transmit the weather data to one or more vehicle systems. Additionally or alternatively, the weather station server can be a global weather station server that is configured to acquire weather data corresponding to multiple locations, such as an entire state, county, country, etc. The global weather station server can also operate as a server configured to collect weather data from a plurality of local weather station servers and transmit the collected weather data to one or more vehicle systems. In some embodiments, the weather station server can be configured to estimate weather conditions in various ways and include varying types of information in the weather data. For example, the weather station server can estimate weather conditions in the form of fog, mist, snow, and/or rain "donuts" or other shaped representations, cloud, fog, and mist droplet distribution, density, and diameter, and/or other forms. The act of such a weather condition estimation might involve the weather station server (or the vehicle) monitoring and analyzing an indication of a fog, mist, rain, etc. donut's quality. Other example functionality of local or global weather station servers is possible as well.

To facilitate receipt of weather data from a weather station server, the vehicle system, before determining the operating environment of the vehicle, might select a weather station server from a plurality of possible weather station servers and transmit, to the selected weather station server, a query for the weather data. The vehicle system can then receive the weather data from the selected weather station in response to the query. The vehicle system can be configured to select a weather station server based on various criteria. In some examples, the vehicle system can select a weather station server that is within a threshold distance from the current location of the vehicle (e.g., within 16 kilometers). In other examples, the vehicle system can select a weather station server or other weather station data transmitter that is within a threshold distance from an estimated future location of the vehicle (e.g., if the vehicle is en route to a city, the vehicle system might select a weather station server that is within 8 kilometers of the city boundary). Other examples are possible as well.

In some embodiments, the weather station server can be configured to publish updates to weather data in certain locations to a fleet of vehicles (e.g., multiple distinct vehicle systems associated with multiple distinct vehicles) or to individual vehicles. Further, the weather station server can be configured to transmit weather data to the vehicle system in response to receiving a query for the weather data from the vehicle system and/or without being specifically requested by the vehicle system (e.g., configured to publish weather data updates for the particular location every 30 minutes).

In any of the examples provided herein, the weather data can be time stamped so that the vehicle system can use the timestamp as a reference in determining the operating environment of the vehicle. For example, if a time stamp indicates that one vehicle experienced fog in a particular region 35 minutes ago, another vehicle that is approaching the same region might determine that, based on the time stamp providing a time that exceeds a predefined threshold (e.g., 30 minutes), there is a threshold high likelihood that the foggy conditions are no longer present. Thus, the other vehicle might not adjust sensor field of view volumes to account for such foggy conditions, or may adjust the accepted sensor field of view volume after one or more other signals confirming the potential for the foggy condition.

Figure 7:
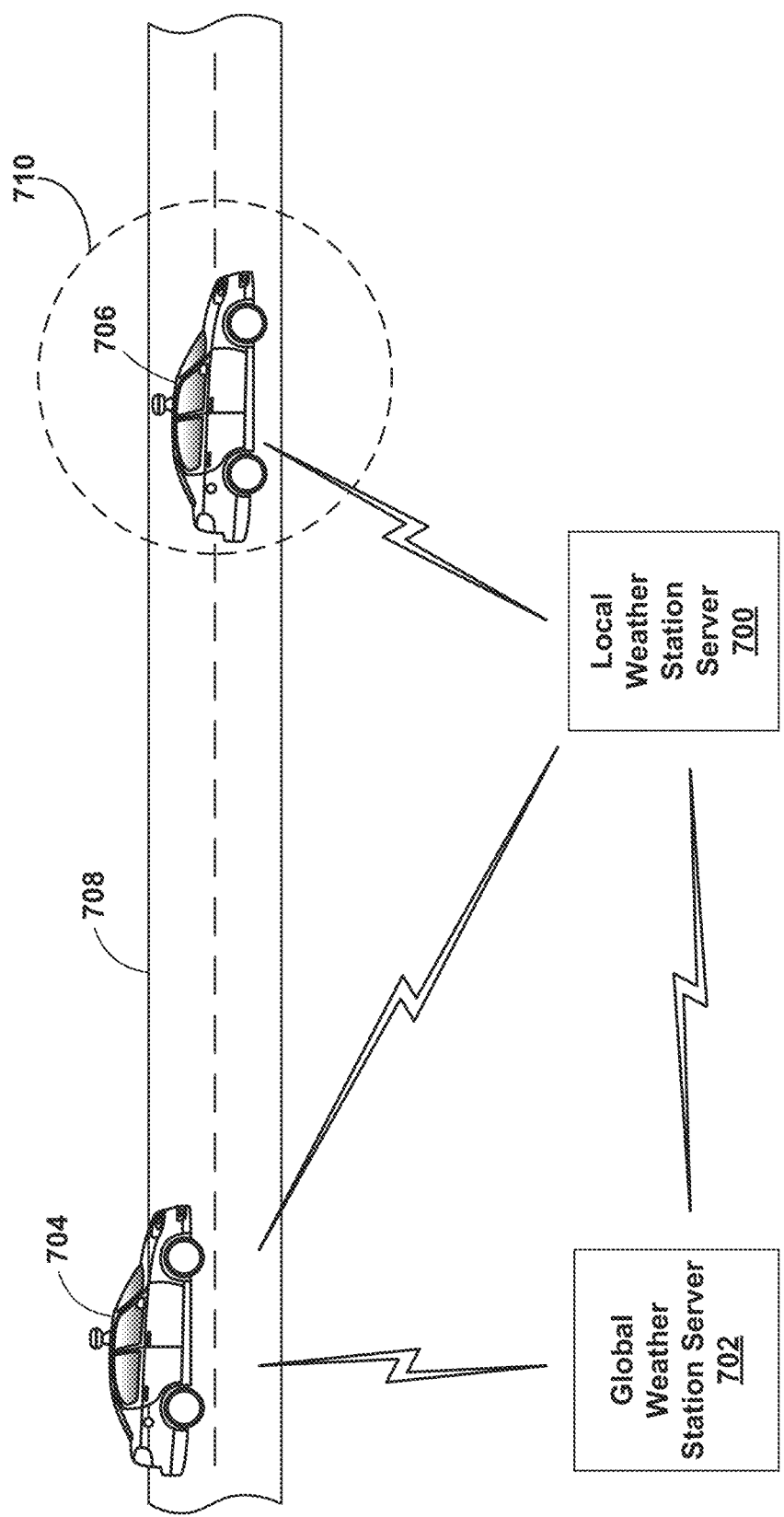
FIG. 7 illustrates an example communication system in which vehicles are in communication with a local weather station server and a global weather station server.

FIG. 7 illustrates an example communication system in which example vehicles are in communication with a local weather station server 700 and a global weather station server 702. In particular, FIG. 7 illustrates a first vehicle 704 and a second vehicle 706 on a route of travel 708 (e.g., a road). Further, FIG. 7 depicts an example region 710 of interest to which weather data may correspond. Although FIG. 7 shows the vehicles 704, 706 in communication with the servers 700, 702 directly, such communication may additionally or alternatively be carried out via one or more other computing devices, such as remote computing system 302 of FIG. 3.

In one example, the first vehicle 704 can query one or more of the servers 700, 702 for weather data corresponding to region 710, since region 710 is along the route of travel 708 for the first vehicle 704. As discussed above, the first vehicle 704 might determine that the local weather station server 700 is within a threshold distance from the current location of the first vehicle 740 and/or within a threshold distance from region 710 and responsively select the local weather station server 700 to query for weather data corresponding to region 710. Additionally or alternatively, the second vehicle 706 might acquire sensor data indicating at least one weather condition present in region 710 and transmit weather data indicating the condition(s) to the first vehicle 704 directly, or the first vehicle 704 can receive the weather data via another computing device, such as one or more of the servers 700, 702.

By configuring vehicle systems and weather station servers in the manner described above, weather updates can be efficiently provided to vehicles, thus enabling vehicles to quickly adjust sensor field of view volumes to adapt to changing weather conditions.

Additionally or alternatively to weather station server(s) being configured to acquire, collect, manage, and transmit weather data, the vehicle system can receive the weather data directly or indirectly from other vehicle systems for other vehicles. For example, one vehicle system might transmit the weather data to another vehicle system. As another example, a global system (e.g., server computing system 306 or remote computing system 302) might be configured to receive and transmit weather data associated with a variety of geographic areas to a fleet of vehicles. As such, vehicles can advantageously inform each other as to weather conditions in areas where other vehicles are currently travelling or planning on travelling, thus keeping each other informed in real time and enabling each other to quickly adjust sensor field of view volumes accordingly.

In line with the discussion above, the vehicle might be configured in some embodiments to operate as a weather station that collects and sends weather data to other vehicles (e.g., other vehicles configured to operate in an autonomous mode), a weather station server, and/or another backend server (e.g., server computing system 306 of FIG. 3). Additionally or alternatively, the vehicle might be configured to operate as a weather station server that facilitates communication of weather data between vehicles, weather stations, and/or other servers, and/or that collects weather data. For brevity, a vehicle configured to operate as a weather station and/or weather station server will be referred to as a weather station vehicle. In some examples, a fleet of weather station vehicles can share weather data amongst themselves, which can help to localize the weather data, since the fleet of vehicles may share amongst themselves, and/or be informed by the backend server, of each other's locations. An example advantage of weather station vehicles is to reduce reliance by autonomous vehicles on other weather stations or other resources.

A vehicle configured to operate as a weather station server can be configured with any one or more of the sensors described herein and use such sensor(s) to acquire the weather data. Additionally or alternatively, such sensor(s) can be specially modified to enable the sensor(s) to acquire additional or more detailed weather information than usual, such as Additionally or alternatively, such a vehicle can include additional sensors, components, and computing devices that might enable the vehicle to acquire and provide the kind of weather data that a weather station might provide, but might not typically be used during standard operation of the vehicle (e.g., when the vehicle is not operating as a weather station server). For example, the vehicle can include a sensor configured to determine an air quality of the air of the vehicle's environment, a sensor configured to determine a humidity outside of the vehicle, a solar sensor (e.g., for determining solar load on the vehicle's equipment and calculating expected temperature changes due to the sun that might affect the vehicle and its equipment), a temperature sensor, and/or a rain sensor, among other possibilities. Any one or more of the sensors described herein (e.g., LIDAR, radar, camera, thermal, humidity, air quality, solar, rain, etc.) can be physically distinct sensors or can be integrated together as a single sensor configured for use with acquiring weather data to facilitate the vehicle's operation as a weather station server. Further, such sensors can be mounted to a variety of locations inside and outside the vehicle, such as the roof, windshield, mirrors, etc.

In some embodiments, a vehicle configured to operate as a weather station server can be assigned to acquire weather data with a particular geographic location, such as a city or suburb. Additionally or alternatively, such a vehicle can acquire weather data for a particular weather service or services, such as a local, national, or global radio, television, or online weather service.

In some embodiments, additionally or alternatively to vehicle systems adjusting sensor field of view volumes, the vehicle system or other computing system such as the remote computing system 302 can be configured to reroute vehicles based on weather conditions. For example, the second vehicle 706 in FIG. 7 might determine and report, to remote computing system 302 or one of servers 700, 702, severe weather in region 710 and at least one sensor field of view volume reduction that the vehicle system of the second vehicle 706 reduced beyond a threshold value due to the severe weather. The threshold value might be a value indicating a field of view volume at which the at least one sensor that was reduced beyond that value might not be reliable for use in navigating through the severe weather. Thus, if the remote computing system 302 or other computing system associated with the first vehicle 704 (including the first vehicle's vehicle system) determines that the reduction was beyond the threshold value, the remote computing system 302 might responsively redirect the first vehicle 704 (which has not yet reached region 710) to take an alternative route. Other examples are possible as well, such as scenarios in which it might be desirable for vehicles to avoid less severe weather.

A decision to reroute a vehicle can be determined based on other factors as well, such as a size of the region experiencing the weather conditions. For example, if a region experiencing fog is determined to be smaller than a threshold size (e.g., a circular region having a radius of 5 kilometers or less), the vehicle might be rerouted to avoid the region due to the region being small enough such that rerouting the vehicle might not increase the vehicle's estimated travel time to a substantial degree. Other examples are possible as well.

In some situations, it might be desirable for the vehicle system to perform at least one of the disclosed operations proactively before the vehicle reaches the particular location along the route of travel with which the determined operating environment is associated (e.g., a region having rainy weather, a segment of the road with heavy traffic, etc.). For example, the vehicle system can be configured to perform the act of adjusting of the field of view volume of the at least one sensor within a threshold period of time (e.g., 5 minutes) before the vehicle is estimated to reach the particular location. Additionally or alternatively, the vehicle system can be configured to perform the act of adjusting of the field of view volume of the at least one sensor within a threshold distance (e.g., 1.6 kilometers) before the vehicle is estimated to reach the particular location. To facilitate these determinations, the vehicle system might have stored, and might continuously update, data representing an estimated route of travel and estimated times to one or more points along the route of travel, including the final destination and/or one or more intermediate points. Other examples are possible as well.

Figure 8:
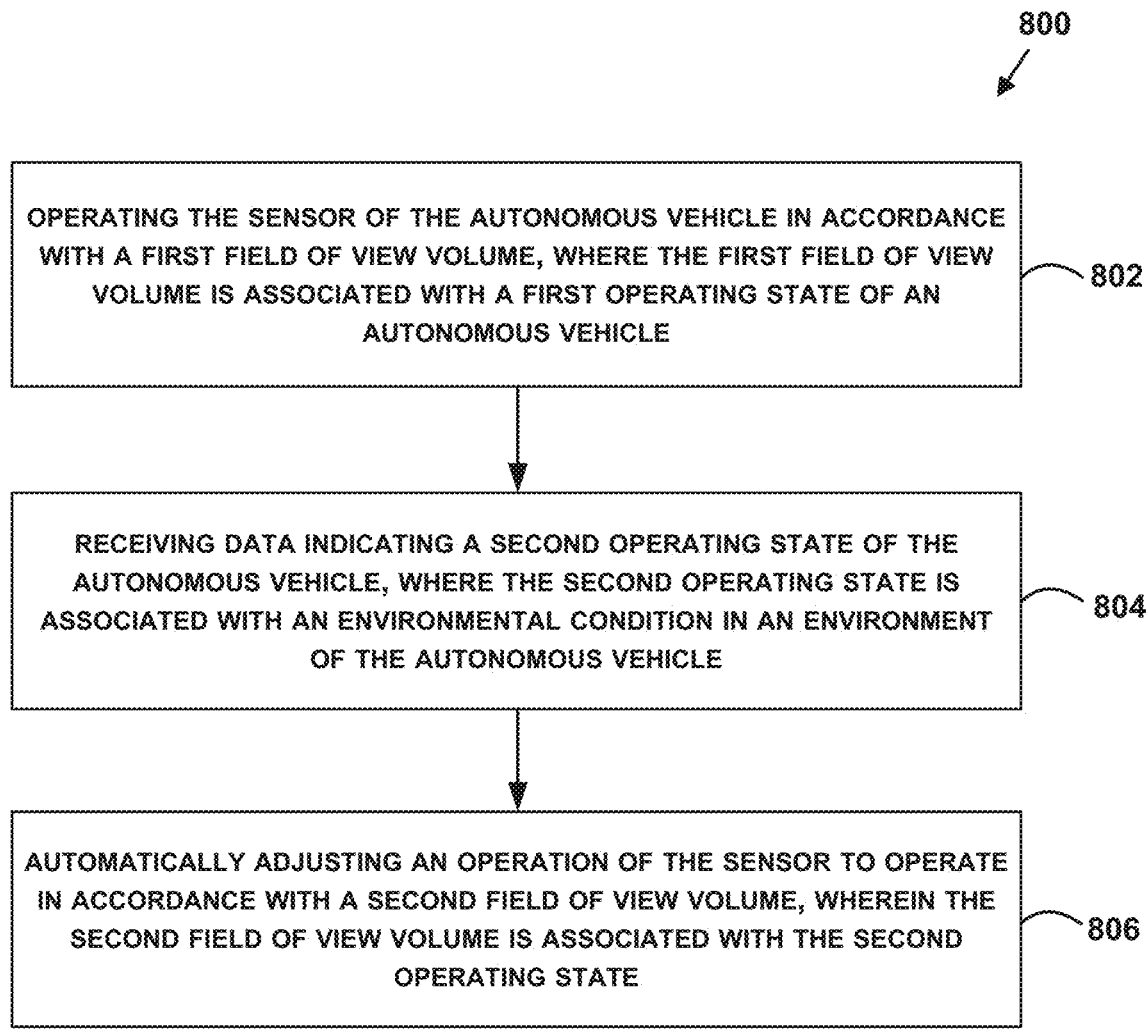
FIG. 8 illustrates another example method.

FIG. 8 is a flowchart of another method 800, according to an example embodiment. Method 800 may include one or more operations, functions, or actions as illustrated by one or more of blocks 802-806.

At block 802, method 800 involves operating the sensor of the autonomous vehicle in accordance with a first field of view volume, where the first field of view volume is associated with a first operating environment of an autonomous vehicle.

At block 804, method 800 involves receiving data indicating a second operating environment of the autonomous vehicle, where the second operating environment is associated with an environmental condition in an environment of the autonomous vehicle.

At block 806, method 800 involves automatically adjusting an operation of the sensor to operate in accordance with a second field of view volume, wherein the second field of view volume is associated with the second operating environment.

In some embodiments, the sensor can be one of: LIDAR, radar, and camera.

In some embodiments, the environmental condition can be a weather condition associated with one of: fog, rain, and snow.

In some embodiments, the environmental condition can be associated with a sun condition, which can be associated with a time of day such as daytime, twilight, or nighttime.

In some embodiments, method 800 can also involve controlling the autonomous vehicle using data from the sensor operating with the second field of view volume. The act of controlling the autonomous vehicle using data from the sensor operating with the second field of view volume can involve adjusting the speed of the autonomous vehicle.

In some embodiments, the autonomous vehicle can be a first autonomous vehicle, and the act of receiving data indicating a second operating environment of an autonomous vehicle can involve comprises receiving data of an operating environment of a second autonomous vehicle. The second autonomous vehicle can be operated on a planned route of the first autonomous vehicle.

In some embodiments, the act of receiving data indicating a second operating environment of an autonomous vehicle can involve receiving data of an environmental condition in an environment of a second autonomous vehicle.

In some embodiments, the act of automatically adjusting an operation of the sensor to operate in accordance with a second field of view volume can involve discarding data associated with a field of view range beyond a maximum field of view range associated with the second field of view volume.

In some embodiments, the act of automatically adjusting an operation of the sensor to operate in accordance with a second field of view volume can involve adjusting an azimuth or elevation associated with the sensor to a respective azimuth or elevation associated associated with the second field of view volume based on a driving direction of the autonomous vehicle.

As discussed above, the field of view volume for at least one of the vehicle's sensors can be adjusted based on an ODD for the vehicle. The vehicle can have multiple ODDs, each including at least one of an environmental condition, a geographical condition, a time-of-day condition, a traffic condition, or a roadway condition. Further, each ODD can be associated with a respective predetermined field of view volume for at least one sensor of the one or more sensors that represents a space surrounding the vehicle within which the at least one sensor is expected to detect objects at a particular confidence level. In some examples, the vehicle system can store in memory an identifier for each ODD and, for each ODD, the condition(s) that the ODD includes and the respective predetermined field of view volume for at least one of the one or more sensors.

Figure 9:
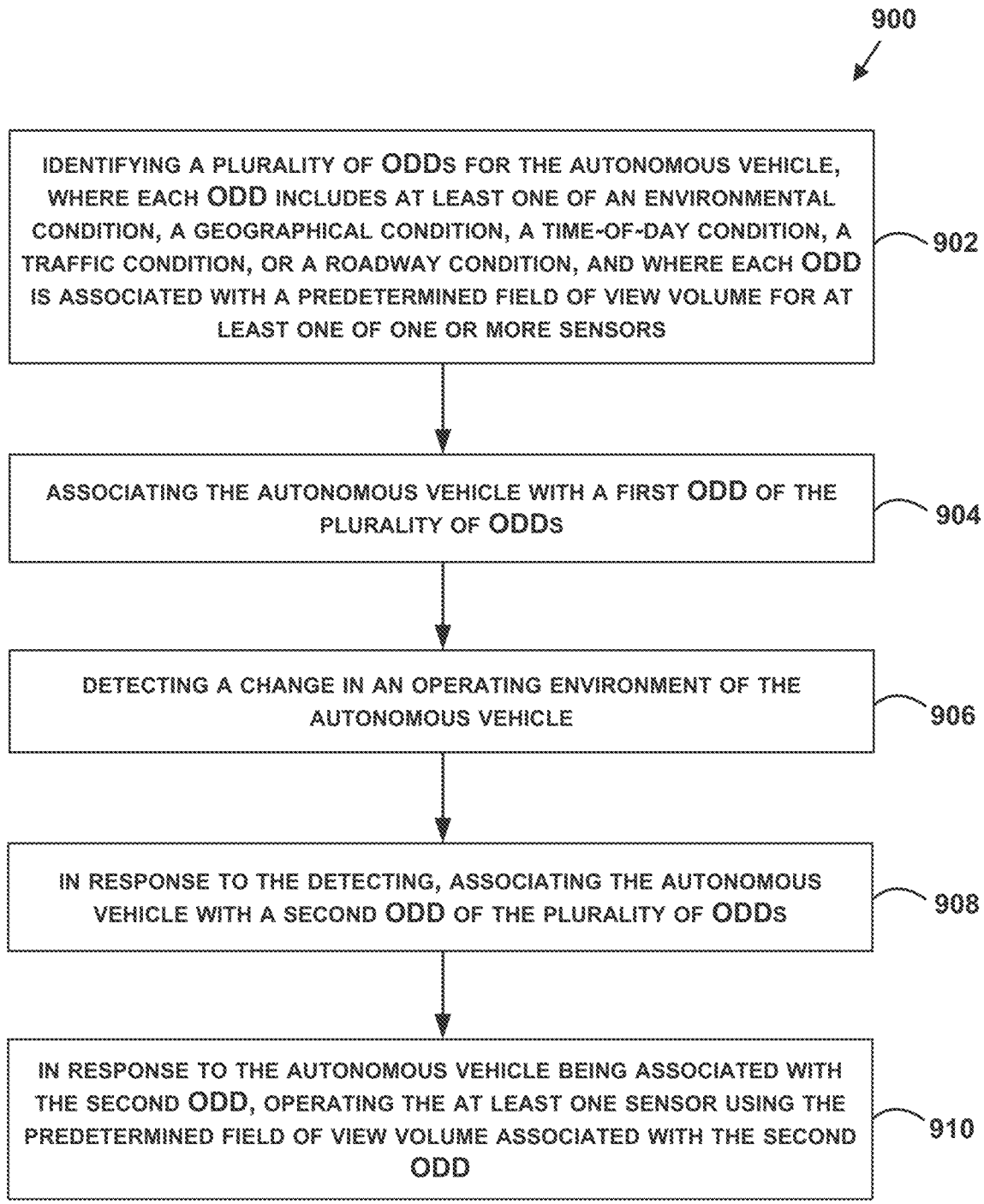
FIG. 9 illustrates another example method.

FIG. 9 is a flowchart of another method 900, according to an example embodiment. Method 900 may include one or more operations, functions, or actions as illustrated by one or more of blocks 902-906.

At block 902, method 900 involves identifying a plurality of ODDs for the autonomous vehicle, where each ODD includes at least one of an environmental condition, a geographical condition, a time-of-day condition, a traffic condition, or a roadway condition, and where each ODD is associated with a predetermined field of view volume for at least one of one or more sensors. In some examples, the act of identifying the plurality of ODDs can involve referring to where the ODDs for the vehicle are stored in memory.

At block 904, method 900 involves associating the autonomous vehicle with a first ODD of the plurality of ODDs. In some examples, the vehicle system can use one or more of the vehicle's sensors and/or one or more sensors located remotely from the vehicle (e.g., a sensor of another vehicle or a sensor mounted on a roadway structure such as a stop sign, median, traffic light, etc.) to detect one or more conditions of the vehicle's environment and select one of the plurality of ODDs—namely, selecting the ODD that includes the detected condition(s). The act of associating the vehicle with the first ODD can involve the vehicle system setting itself or at least one of its subsystems to operate using one or more parameters associated with the first ODD. Thus, in response to associating the vehicle with the first ODD, the vehicle system can operate at least one of the vehicle's sensors using the predetermined field of view volume associated with the first ODD.

At block 906, method 900 involves detecting a change in an operating environment of the autonomous vehicle. The act of detecting the change can involve detecting the change using one or more of the vehicle's sensor. Additionally or alternatively, the act of detecting the change can involve detecting the change using an external sensor, different from the vehicle's sensors. In particular, the external sensor can be located remote from the vehicle itself, but can be communicatively linked to the vehicle system directly, such as by way of a wireless communication interface, or indirectly, such as when the vehicle system receives data from the external sensor via a server or other intermediary computing device. In some examples, the external sensor can be mounted to a roadway structure, such as a stop sign, traffic light, median, bridge, curb, or reflector, among other possible structures.

At block 908, method 900 involves in response to the detecting, associating the autonomous vehicle with a second ODD of the plurality of ODDs. In some examples, the act of associating the vehicle with the second ODD can involve the vehicle system setting itself or at least one of its subsystems to operate using one or more parameters associated with the second ODD.

At block 910, method 900 involved in response to the autonomous vehicle being associated with the second ODD, operating the at least one sensor using the predetermined field of view volume associated with the second ODD.

In some implementations, the act of operating the at least one sensor using the predetermined field of view volume associated with the second ODD can involve operating the at least one sensor using a smaller field of view volume than when operating the at least one sensor using a predetermined field of view volume associated with the first ODD. For example, the first ODD can include an environmental condition of a clear weather condition and the second ODD can include an environmental condition of one or more of a rainy condition, a foggy condition, or a snowy condition, thus making it helpful to use a smaller field of view volume for the second ODD. In other implementations, the act of operating the at least one sensor using the predetermined field of view volume associated with the second ODD can involve operating the at least one sensor using a larger field of view volume than when operating the at least one sensor using a predetermined field of view volume associated with the first ODD.

As discussed herein, the first ODD and the second ODD can include other conditions as well. For example, the first ODD can include a first time-of-day condition of a first time-of-day (e.g., morning) and the second ODD can include a second time-of-day condition of a second timeof-day (e.g., evening or night). As another example, the first ODD can include a first traffic condition (e.g., light or no traffic) and the second ODD can include a second traffic condition (e.g., heavy traffic or traffic jam). As yet another example, the first ODD can include a first speed limit of the road on which the vehicle is travelling and the second ODD can include a second speed limit that is higher or lower than the first speed limit. As yet another example, the first ODD can include a first geographically-defined area within which the vehicle is travelling (e.g., surface streets or private property) and the second ODD can include a second geographically-defined area within which the vehicle is travelling (e.g., a highway or public roads). Other examples are possible as well.

By the term "substantially," "approximately," or "about" used herein, it is meant that the recited characteristic, parameter, value, or geometric planarity need not be achieved exactly, but that deviations or variations, including for example, tolerances, measurement error, measurement accuracy limitations and other factors known to skill in the art, may occur in amounts that do not preclude the effect the characteristic was intended to provide.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A system for controlling operation of an autonomous vehicle, the system comprising:
   one or more sensors, each sensor of the one or more sensors being configured to operate in accordance with a field of view volume, the field of view volume representing a space surrounding the autonomous vehicle within which the sensor is expected to detect objects at a confidence level higher than a predefined confidence threshold;
   one or more processors coupled to the one or more sensors; and
   a memory coupled to the one or more processors and having stored thereon instructions that, upon execution by the one or more processors, cause the one or more processors to perform operations comprising:
   identifying a plurality of operational design domains (ODDs) for the autonomous vehicle, wherein each ODD includes a weather condition and at least one of a geographical condition, a time-of-day condition, a traffic condition, or a roadway condition, and wherein each ODD is associated with a predetermined field of view volume for at least one sensor of the one or more sensors;
   processing sensor data transmitted by the at least one sensor based on a first predetermined field of view volume, wherein the first predetermined field of view volume is associated with a first ODD of the plurality of ODDs;
   determining that a change in an operating environment of the autonomous vehicle will occur when the autonomous vehicle reaches a particular location; and
   in response to the determining and before the autonomous vehicle reaches the particular location, processing sensor data transmitted by the at least one sensor based on a second predetermined field of view volume instead of the first predetermined field of view volume, wherein the second predetermined field of view volume is associated with a second ODD of the plurality of ODDs, wherein processing sensor data transmitted by the at least one sensor based on the second predetermined field of view volume comprises ignoring any sensor data transmitted by the at least one sensor that corresponds to a range, azimuth, or elevation greater than a respective range, azimuth or elevation of the second predetermined field of view volume.

2. The system of claim 1, wherein the particular location is along a route of travel of the autonomous vehicle.

3. The system of claim 1, wherein determining that the change in the operating environment of the autonomous vehicle will occur when the autonomous vehicle reaches the particular location comprises receiving, by the autonomous vehicle, weather data indicating a weather condition for the particular location.

4. The system of claim 3, wherein the autonomous vehicle receives the weather data from a server.

5. The system of claim 1, wherein the second predetermined field of view volume is smaller than the first predetermined field of view volume.

6. The system of claim 5, wherein the weather condition of the first ODD is a clear weather condition, and
   wherein the weather condition of the second ODD is one or more of a rainy condition, a foggy condition, or a snowy condition.

7. The system of claim 1, wherein the first ODD includes a first time-of-day condition of a first time-of-day, and
   wherein the second ODD includes a second time-of-day condition of a second time-of-day different from the first time-of-day.

8. The system of claim 1, wherein the first ODD includes a first traffic condition, and
   wherein the second ODD includes a second traffic condition different from the first traffic condition.

9. The system of claim 1, wherein the first ODD includes a first roadway condition that includes a first speed limit, and wherein the second ODD includes a second roadway condition that includes a second speed limit, wherein the second speed limit is different than the first speed limit.

10. A system comprising:
    one or more sensors, each sensor of the one or more sensors being configured to operate in accordance with a field of view volume;
    one or more processors coupled to the one or more sensors; and
    a memory coupled to the one or more processors and having stored thereon instructions that, upon execution by the one or more processors, cause the one or more processors to perform operations comprising:
    processing sensor data transmitted by at least one sensor of the one or more sensors based on a first field of view of view volume;
    determining a future operating environment of an autonomous vehicle from among a plurality of defined operating environments, wherein the plurality of defined operating environments comprises three or more of: (i) a default state, (ii) a clear weather state, (iii) a daytime operation state, (iv) a nighttime operation state, (v) a rainy weather state, (vi) a snowy weather state, (vii) a foggy weather state, (viii) a state for a particular type of a road on which the autonomous vehicle is travelling, (ix) a state in which at least a threshold quantity of vehicles are on the road within a threshold distance from the autonomous vehicle or (x) a state in which at least one sensor of the one or more sensors has a sensor error, wherein the future operating environment is associated with a particular location along a route of travel of the autonomous vehicle;

selecting an adjusted field of view volume based on the determined future operating environment of the autonomous vehicle and a mapping between each defined operating environment of the plurality of defined operating environments and a corresponding adjusted field of view volume for at least one sensor of the one or more sensors; and adjusting a field of view volume of the at least one sensor from the first field of view volume to the adjusted field of view volume before the autonomous vehicle reaches the particular location, wherein the adjusted field of view volume is different from the first field of view volume, wherein adjusting the field of view volume of the at least one sensor from the first field of view volume to the adjusted field of view volume comprises processing sensor data transmitted by the at least one sensor based on the adjusted field of view volume instead of the first field of view volume, and wherein processing sensor data transmitted by the at least one sensor based on the adjusted field of view volume comprises ignoring any sensor data transmitted by the at least one sensor that corresponds to a range, azimuth, or elevation greater than a respective range, azimuth or elevation of the adjusted field of view volume.

11. The system of claim 10, wherein the corresponding adjusted field of view volume is part of a corresponding set of adjusted field of view volumes comprising a respective adjusted field of view volume for each of a plurality of sensor types, and
wherein the plurality of sensor types comprises two or more of: a LIDAR sensor, a radar sensor, or a camera.

12. The system of claim 10, wherein the one or more sensors comprises multiple sets of sensors, each having a respective sensor type,
wherein adjusting the field of view volume of the at least one sensor comprises adjusting a field of view volume of all sensors in at least one of the sets of sensors.

13. The system of claim 12, wherein the multiple sets of sensors comprises two or more of: a set of LIDAR sensors, a set of radar sensors, or a set of cameras.

14. The system of claim 10, wherein ignoring the sensor data transmitted by the at least one sensor that corresponds to the range, azimuth, or elevation greater than the respective range, azimuth or elevation of the adjusted field of view volume comprises discarding the sensor data transmitted by the at least one sensor that corresponds to the range, azimuth, or elevation greater than the respective range, azimuth or elevation of the adjusted field of view volume.

15. The system of claim 10, wherein the at least one sensor comprises a LIDAR sensor, and
wherein adjusting the field of view volume of the at least one sensor from the first field of view volume to the adjusted field of view volume further comprises controlling the LIDAR sensor to acquire sensor data by transmitting one or more laser pulses having an adjusted power level associated with the adjusted field of view volume.

16. The system of claim 10, wherein the at least one sensor comprises a radar sensor, and
wherein adjusting the field of view volume of the at least one sensor from the first field of view volume to the adjusted field of view volume further comprises controlling the radar sensor to acquire sensor data by transmitting one or more radio waves having an adjusted radio wave characteristic associated with the adjusted field of view volume.

17. The system of claim 10, wherein ignoring the sensor data transmitted by the at least one sensor that corresponds to the range, azimuth, or elevation greater than the respective range, azimuth or elevation of the adjusted field of view volume comprises not using the sensor data transmitted by the at least one sensor that corresponds to the range, azimuth, or elevation greater than the respective range, azimuth or elevation of the adjusted field of view volume as a basis for object detection.

18. A method performed by a computing device configured to control operation of an autonomous vehicle, wherein the autonomous vehicle comprises one or more sensors, each sensor of the one or more sensors being configured to operate in accordance with a field of view volume, the method comprising:
processing sensor data transmitted by at least one sensor of the one or more sensors based on a first field of view of view volume;

determining a future operating environment of the autonomous vehicle from among a plurality of defined operating environments, wherein the plurality of defined operating environments comprises three or more of: (i) a default state, (ii) a clear weather state, (iii) a daytime operation state, (iv) a nighttime operation state, (v) a rainy weather state, (vi) a snowy weather state, (vii) a foggy weather state, (viii) a state for a particular type of a road on which the autonomous vehicle is travelling, (ix) a state in which at least a threshold quantity of vehicles are on the road within a threshold distance from the autonomous vehicle or (x) a state in which at least one sensor of the one or more sensors has a sensor error, wherein the future operating environment is associated with a particular location along a route of travel of the autonomous vehicle;

selecting an adjusted field of view volume based on the determined future operating environment of the autonomous vehicle and a mapping between each defined operating environment of the plurality of defined operating environments and a corresponding adjusted field of view volume for the at least one sensor;

adjusting a field of view volume of the at least one sensor from the first field of view volume to the adjusted field of view volume before the autonomous vehicle reaches the particular location, wherein the adjusted field of view volume is different from the first field of view volume, wherein adjusting the field of view volume of the at least one sensor from the first field of view volume to the adjusted field of view volume comprises processing sensor data transmitted by the at least one sensor based on the adjusted field of view volume instead of the first field of view volume, and wherein processing sensor data transmitted by the at least one sensor based on the adjusted field of view volume comprises ignoring any sensor data transmitted by the at least one sensor that corresponds to a range, azimuth, or elevation greater than a respective range, azimuth or elevation of the adjusted field of view volume; and controlling the autonomous vehicle to operate using the at least one sensor having the adjusted field of view volume.

19. The method of claim 18, wherein ignoring the sensor data transmitted by the at least one sensor that corresponds to the range, azimuth, or elevation greater than the respective range, azimuth or elevation of the adjusted field of view volume comprises discarding the sensor data transmitted by the at least one sensor that corresponds to the range, azimuth, or elevation greater than the respective range, azimuth or elevation of the adjusted field of view volume.

20. The method of claim 18, wherein ignoring the sensor data transmitted by the at least one sensor that corresponds to the range, azimuth, or elevation greater than the respective range, azimuth or elevation of the adjusted field of view volume comprises not using the sensor data transmitted by the at least one sensor that corresponds to the range, azimuth, or elevation greater than the respective range, azimuth or elevation of the adjusted field of view volume as a basis for object detection.

* * * * *